US010071474B2

(12) United States Patent
Nagano et al.

(10) Patent No.: US 10,071,474 B2
(45) Date of Patent: Sep. 11, 2018

(54) CUTTING GUIDE AND METHOD OF INSTALLING EXHAUST TUBE

(71) Applicant: NORTIZ CORPORATION, Hyogo (JP)

(72) Inventors: Takanori Nagano, Kakogawa (JP); Masaki Sugatani, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 513 days.

(21) Appl. No.: 14/475,367

(22) Filed: Sep. 2, 2014

(65) Prior Publication Data

US 2016/0059406 A1    Mar. 3, 2016

(51) Int. Cl.
*B25H 7/00*   (2006.01)
*F16L 55/18*   (2006.01)
*F16L 55/165*   (2006.01)

(52) U.S. Cl.
CPC ............ *B25H 7/005* (2013.01); *F16L 55/165* (2013.01); *F16L 55/18* (2013.01)

(58) Field of Classification Search
CPC ......... B25H 7/005; F16L 55/165; F16L 55/18
See application file for complete search history.

(56) References Cited

U.S. PATENT DOCUMENTS

| | | | | |
|---|---|---|---|---|
| 2,449,265 A | * | 9/1948 | Williams | F01P 11/04 138/104 |
| 6,560,887 B2 | * | 5/2003 | Byrnes | G01B 3/563 33/529 |
| 7,685,734 B1 | * | 3/2010 | Burger | B25H 7/005 33/1 G |

FOREIGN PATENT DOCUMENTS

| | | |
|---|---|---|
| JP | 06-080086 U | 11/1994 |
| JP | 2001-152639 A | 6/2001 |
| JP | 2010-043707 A | 2/2010 |
| JP | 2012-037006 A | 2/2012 |

* cited by examiner

*Primary Examiner* — Ryan J Walters
(74) *Attorney, Agent, or Firm* — Studebaker & Brackett PC

(57) ABSTRACT

A cutting guide serves to adjust a length of an exhaust tube introduced in an exhaust pipe so as to adapt to combination of the exhaust pipe communicating from the inside to the outside of a building with an exhaust terminal attached to an end portion of the exhaust pipe on an outdoor side. The cutting guide has a reference site for alignment with an exhaust pipe unit including the exhaust pipe, and has an indication of a cutting position of the exhaust tube for adjusting a length of the exhaust tube protruding from the end portion of the exhaust pipe portion on the outdoor side to a length adapted to a type of the exhaust terminal.

8 Claims, 21 Drawing Sheets

FIG.7
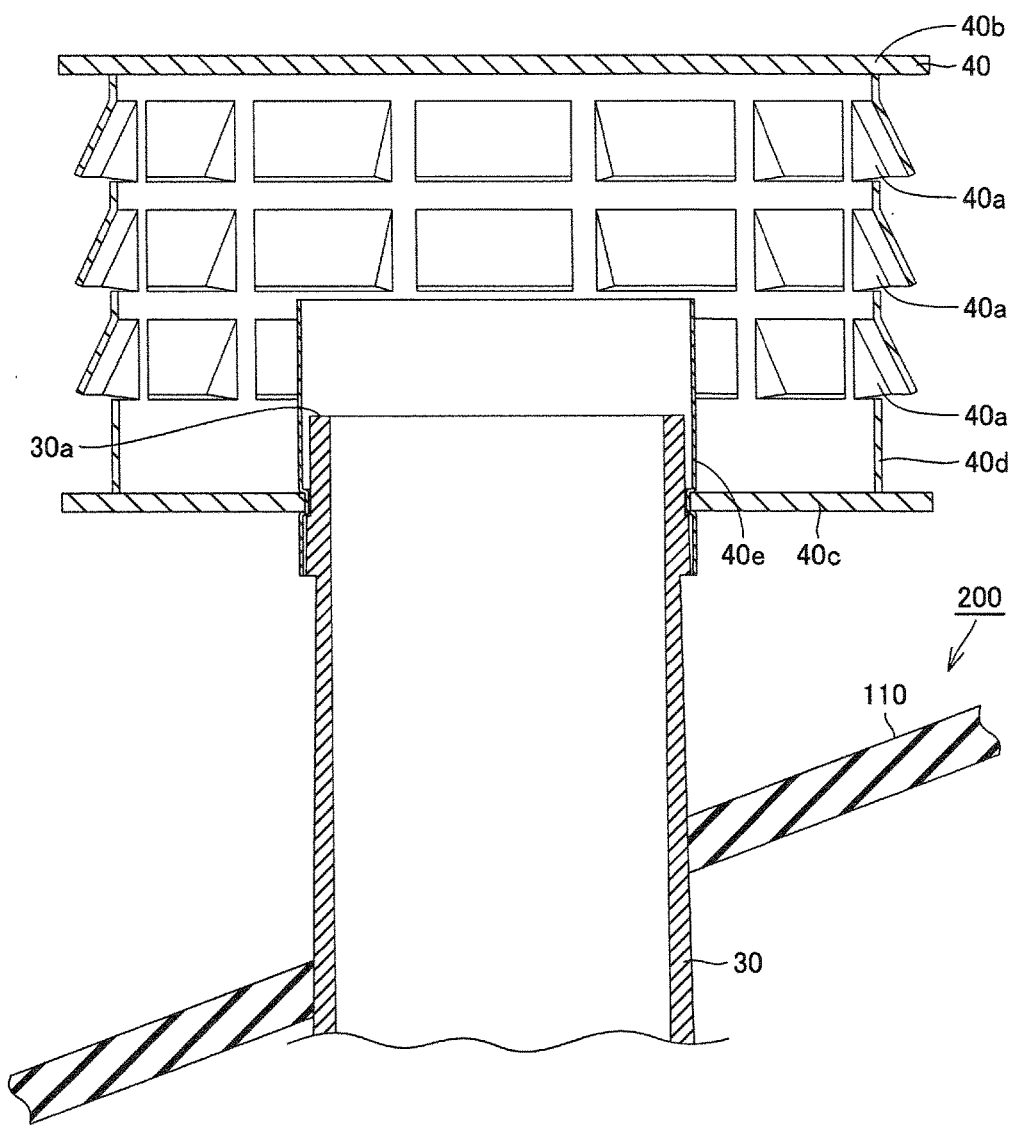
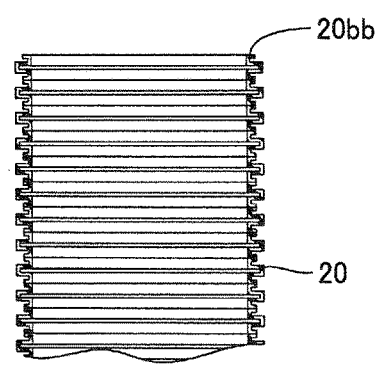

CUTTING GUIDE AND METHOD OF INSTALLING EXHAUST TUBE

BACKGROUND OF THE INVENTION

Field of the Invention

The present invention relates to a cutting guide and a method of installing an exhaust tube.

Description of the Background Art

In markets, there are locations where an exhaust pipe (a B vent) already placed in a building cannot be removed from a point of view of maintaining appearance of buildings. At such a location, a combustion apparatus can be replaced by inserting a new exhaust tube (a flexible exhaust tube) in the exhaust pipe and an exhaust terminal (a rain cap) which have already been placed. In this case, an exhaust gas from the combustion apparatus emitted through the exhaust tube is emitted outdoors through the exhaust terminal.

Exhaust terminals are various in shape. Therefore, a length of an exhaust tube protruding from an exhaust pipe should be adjusted in accordance with a type of an exhaust terminal. At a site of installation where a new exhaust tube is introduced, adjustment of a length of an exhaust tube in accordance with a type of an exhaust terminal is not easy but requires much time and trouble.

As a technique for facilitating adjustment of a length of an exhaust tube, for example, Japanese Patent Laying-Open No. 2010-43707 describes a jig for a flexible pipe having a main body portion, a protruding portion protruding from the main body portion, and a through hole provided in the main body portion. According to this jig for a flexible pipe, a cutting position of flexible piping can be determined in such a manner that an operator applies the jig for a flexible pipe to flexible piping and thereafter puts a mark on the flexible piping exposed through the through hole. According to this jig for a flexible pipe, however, the protruding portion protruding from the main body portion should be applied to an end portion of a cover for the flexible piping partially covered with the cover. Therefore, the jig for a flexible pipe cannot be made use of for adjustment of a length of an exhaust tube described above.

SUMMARY OF THE INVENTION

The present invention was made in view of the problems above, and an object thereof is to provide a cutting guide facilitating adjustment of a length of an exhaust tube in accordance with a type of an exhaust terminal, and a method of installing an exhaust tube with the use of a cutting guide.

A cutting guide according to the present invention is a cutting guide for adjusting a length of an exhaust tube introduced in an exhaust pipe so as to adapt to combination of the exhaust pipe communicating from the inside to the outside of a building with an exhaust terminal attached to an end portion of the exhaust pipe on an outdoor side. This cutting guide has a reference site for alignment with an exhaust pipe unit including the exhaust pipe and a first indication of a cutting position of the exhaust tube for adjusting a length of the exhaust tube protruding from the end portion of the exhaust pipe unit on the outdoor side to a length adapted to a type of the exhaust terminal.

Since the cutting guide according to the present invention has a reference site for alignment with an exhaust pipe unit including an exhaust pipe, arrangement at an appropriate position on the exhaust pipe unit can be achieved. In addition, the cutting guide according to the present invention has a first indication of a cutting position of an exhaust tube for adjustment to a length adapted to a type of an exhaust terminal.

Therefore, a cutting position indicated in the cutting guide arranged at an appropriate position on an exhaust pipe unit can allow determination of a cutting position of an exhaust tube in accordance with a type of an exhaust terminal. Thus, the cutting guide according to the present invention facilitates adjustment of a length of an exhaust tube in accordance with a type of an exhaust terminal.

In the cutting guide above, the cutting position in accordance with a type of the exhaust terminal is indicated with a graphic representation and a line. Thus, a cutting position in accordance with a type of an exhaust terminal can easily be determined.

In the cutting guide above, the graphic representation is at least any one of a photograph and an illustration of the exhaust terminal. Thus, a cutting position in accordance with a type of an exhaust terminal can intuitively be determined.

The cutting guide above has a second indication of how to use the cutting guide. Thus, how to use the cutting guide can readily be understood.

The cutting guide above is a rectangular sheet member and has one side for alignment with an outer circumferential surface of the exhaust tube protruding from the end portion of the exhaust pipe unit on the outdoor side and another side for alignment with an upper surface of the end portion of the exhaust pipe unit on the outdoor side, and another side intersects with one side and implements the reference site. Thus, the cutting guide can be arranged accurately at a desired position on the exhaust pipe unit, and hence the exhaust tube can be cut with high accuracy.

In the cutting guide above, one side has a shape fitting to a shape of the outer circumferential surface of the exhaust tube. Thus, since the cutting guide can be arranged accurately at a desired position on the outer circumferential surface of the exhaust tube, the exhaust tube can be cut with high accuracy.

In the cutting guide above, one side has a stepped shape having a plurality of steps and at least one step of the plurality of steps corresponds to the illustrated cutting position. Thus, marking of a cutting position on an exhaust tube is facilitated.

The cutting guide above is a cylindrical member and constructed to be able to surround from an outer circumferential side, a part of an outer circumferential surface of the exhaust tube protruding from the end portion of the exhaust pipe unit on the outdoor side. Thus, since the cutting guide can be arranged at a desired position on the exhaust pipe unit without a worker holding the cutting guide, an operation for cutting an exhaust tube by the worker is facilitated.

The cutting guide above has a sheet member having a surface where the cutting position is shown and an adhesive material formed on a surface opposite to the surface of the sheet member where the cutting position is shown. Thus, a back surface of the cutting guide can be stuck to the exhaust tube. Therefore, since the cutting guide can be arranged at a desired position on the exhaust pipe unit without a worker holding the cutting guide, an operation for cutting an exhaust tube by the worker is facilitated.

A surface of the cutting guide where at least the cutting position is shown is waterproofed. Thus, difficulty in viewing an indication of a cutting position due to raindrops or the like can be suppressed.

The present invention is directed to a method of installing an exhaust tube, with which a length of an exhaust tube introduced in an exhaust pipe is adjusted so as to adapt to combination of the exhaust pipe communicating from the inside to the outside of a building with an exhaust terminal attached to an end portion of the exhaust pipe on an outdoor side, and the method has the following steps. The exhaust tube is introduced from an indoor side to the outdoor side by introducing the exhaust tube into the exhaust pipe from the indoor side of the exhaust pipe. The exhaust terminal is removed. The exhaust tube protruding from the end portion of the exhaust pipe on the outdoor side is cut at a prescribed position. The removed exhaust terminal is attached again. In the step of cutting the exhaust tube, the cutting guide described above is employed.

According to the method of installing an exhaust tube in the present invention, the cutting guide is employed in the step of cutting the exhaust tube. Therefore, a cutting position of the exhaust tube can easily be determined. Thus, a length of an exhaust tube protruding from an exhaust pipe can easily be adjusted to an appropriate length in accordance with a type of an exhaust terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7 to 9 are cross-sectional views schematically showing a first step of a method of installing an exhaust tube in the first embodiment of the present invention.

DESCRIPTION OF THE PREFERRED EMBODIMENTS

An embodiment of the present invention will be described hereinafter with reference to the drawings.

First Embodiment (Exhaust Structure for Combustion Apparatus)

An exhaust structure for combustion apparatus in the present embodiment will initially be described with reference to FIGS. 1 and 2.

Figure 1:
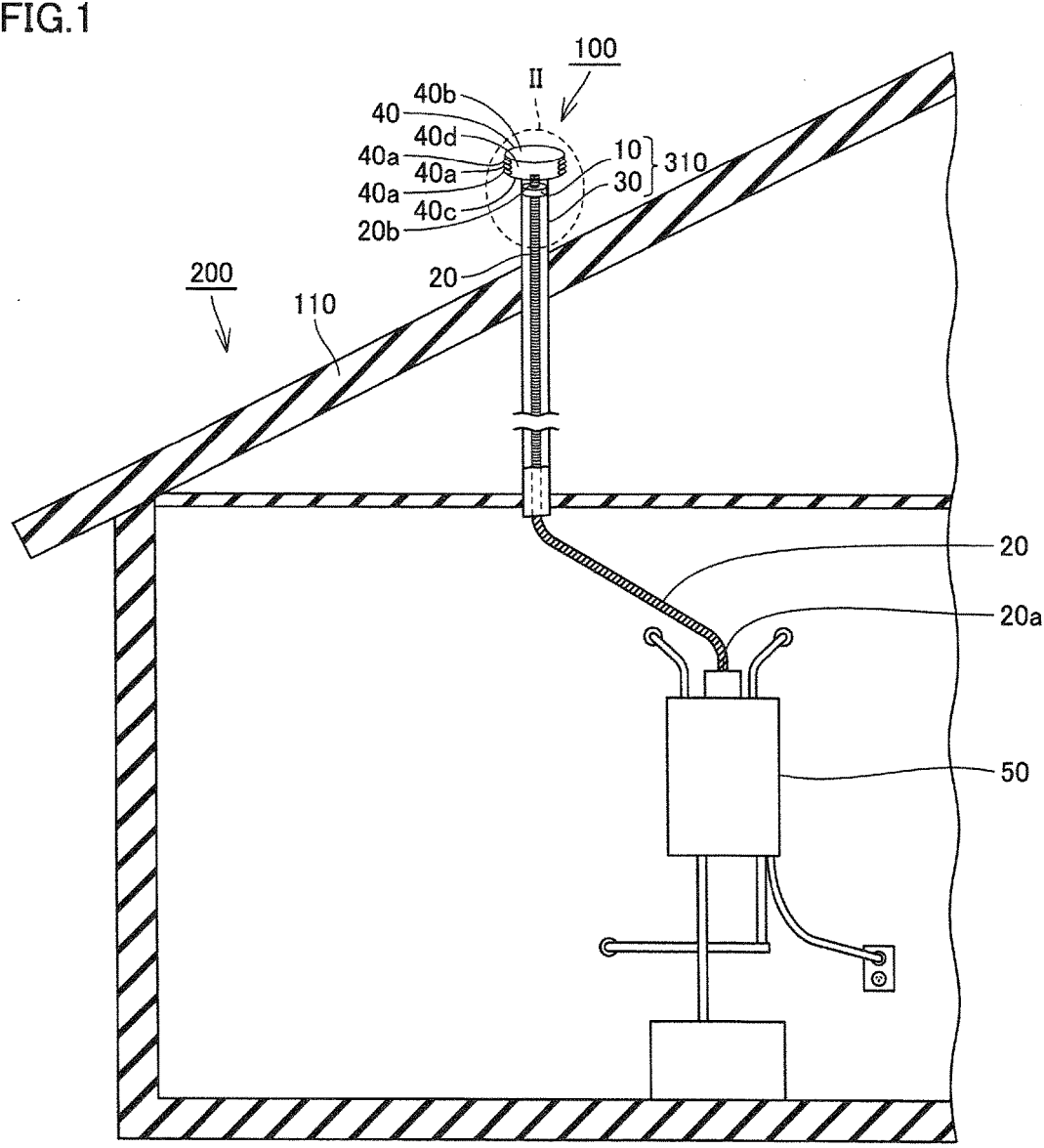
FIG. 1 is a diagram schematically showing a construction of an exhaust structure for combustion apparatus in a first embodiment of the present invention.
Figure 2:
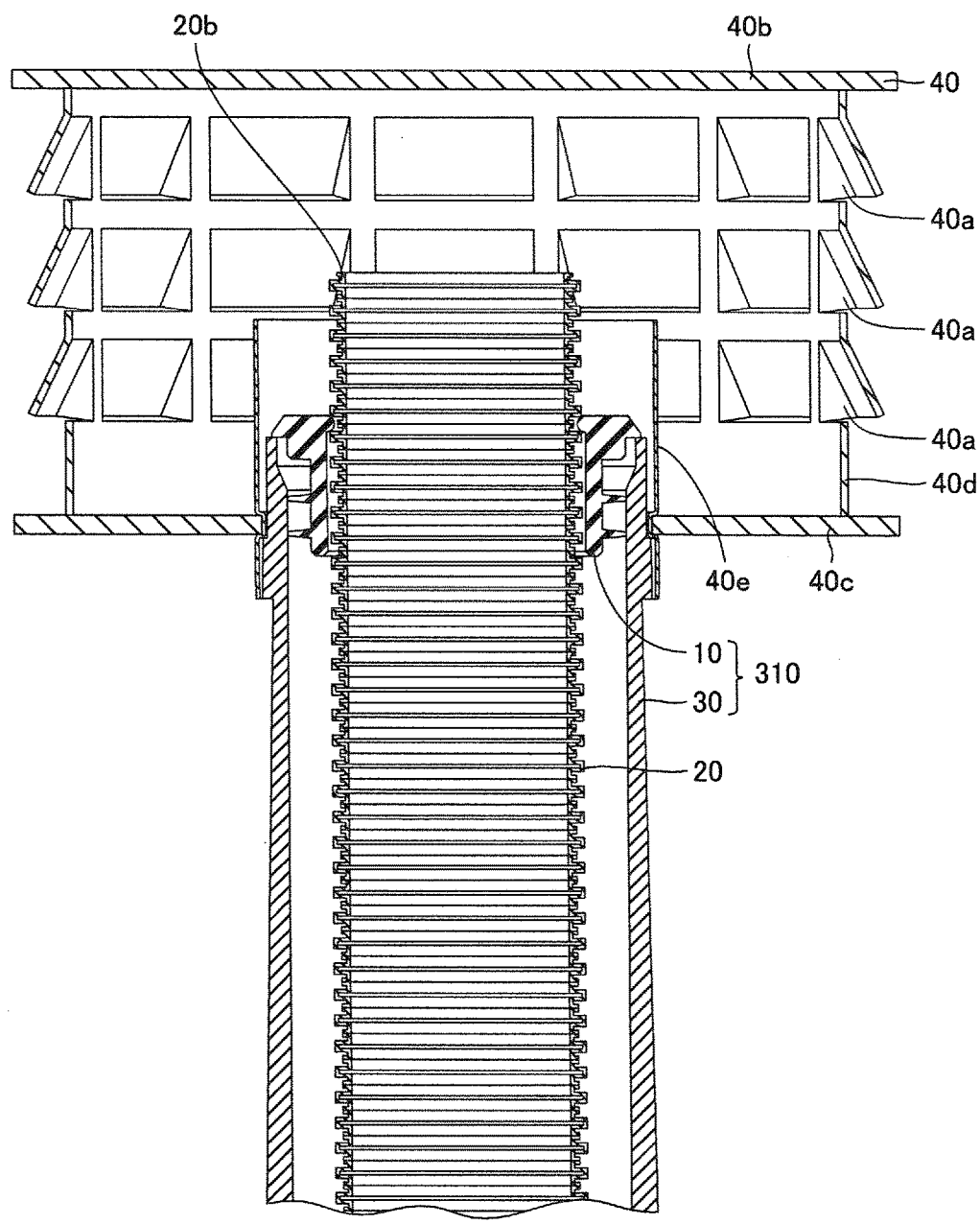
FIG. 2 is a cross-sectional view showing in an enlarged manner, a region II in FIG. 1.

Referring to FIGS. 1 and 2, an exhaust structure for combustion apparatus 100 in the present embodiment mainly has an exhaust pipe unit 310 including an exhaust adapter 10 and an exhaust pipe 30, an exhaust tube 20, an exhaust terminal 40, and a combustion apparatus 50. This exhaust structure for combustion apparatus 100 serves to emit a combustion gas produced in combustion apparatus 50 to the outside of a building 200.

Combustion apparatus 50 is placed inside building 200. This combustion apparatus 50 is implemented, for example, by a water heater for heating water with the combustion gas, however, it may be implemented by a heater for heating the inside of a building with the combustion gas. In a case that a water heater is employed as combustion apparatus 50, the water heater is preferably, for example, a water heater of a latent heat recovery type adapted to an exhaust suction and combustion system.

Exhaust tube 20 includes one end portion 20a and the other end portion 20b. One end portion 20a of exhaust tube 20 is connected to combustion apparatus 50 and the other end portion 20b of exhaust tube 20 extends to the outdoor side. The inside of exhaust tube 20 is defined as an emission path for the combustion gas emitted from combustion apparatus 50. Thus, the combustion gas produced in combustion apparatus 50 can be guided to the outdoor side through exhaust tube 20. Though exhaust tube 20 is implemented as a flexible pipe such as an accordion pipe, it may be a spiral pipe. Thus, it is possible to conform even to exhaust pipe 30 in a complicated shape.

Exhaust pipe 30 is attached to building 200 so as to extend from the inside to the outside, for example, through a roof 110 of building 200. Exhaust pipe 30 may extend from the inside to the outside through a wall. Exhaust pipe 30 is greater in outer diameter than exhaust tube 20. In the inside of this exhaust pipe 30, a part of exhaust tube 20 on a side of the other end portion 20b is introduced.

Exhaust terminal 40 is attached to a tip end of exhaust pipe 30 on the outdoor side. This exhaust terminal 40 has a ceiling wall 40b, a bottom wall 40c, a circumferential wall 40d, and a connection pipe portion 40e (FIG. 2). Ceiling wall 40b is attached to an upper end of circumferential wall 40d, and bottom wall 40c is attached to a lower end of circumferential wall 40d. Connection pipe portion 40e has a cylindrical shape and is attached to bottom wall 40c so as to penetrate bottom wall 40c. In circumferential wall 40d, an exhaust port 40a for exhausting the combustion gas to the outside (outdoors) is formed. This exhaust port 40a allows the combustion gas guided through exhaust tube 20 to be exhausted from exhaust terminal 40 to the outside of building 200.

Connection pipe portion 40e of exhaust terminal 40 is connected to exhaust pipe 30. This connection pipe portion 40e may be an outer cover attached on an outer circumferential side of exhaust pipe 30 or an inner cover attached on an inner circumferential side of exhaust pipe 30. Exhaust terminal 40 is made, for example, of such a material as aluminum or stainless steel.

Exhaust adapter 10 serves to fix exhaust tube 20 to exhaust pipe 30. This exhaust adapter 10 is fitted to an outer circumferential surface of exhaust tube 20 and fitted to an inner circumferential surface of exhaust pipe 30. Exhaust adapter 10 has an inner circumferential surface pressing the outer circumferential surface of exhaust tube 20 while it is fitted to the outer circumferential surface of exhaust tube 20 and has an outer circumferential surface pressing the inner circumferential surface of exhaust pipe 30 while it is fitted to the inner circumferential surface of exhaust pipe 30.

Thus, the inner circumferential surface of exhaust adapter 10 is in intimate contact with the outer circumferential surface of exhaust tube 20 and the outer circumferential surface of exhaust adapter 10 is in intimate contact with the inner circumferential surface of exhaust pipe 30. Therefore, exhaust tube 20 can firmly be fixed to exhaust pipe 30 with exhaust adapter 10, and exhaust adapter 10 can prevent leakage of the combustion gas or drainage water from between exhaust tube 20 and exhaust pipe 30 and hence backflow thereof to the indoor side.

(Combustion Apparatus)

Combustion apparatus 50 included in exhaust structure for combustion apparatus 100 above is preferably implemented by a water heater of a latent heat recovery type, for example, adapted to an exhaust suction and combustion system, as described above. A construction of the water heater of the latent heat recovery type adapted to the exhaust suction and combustion system will be described below with reference to FIGS. 3 and 4.

Figure 3:
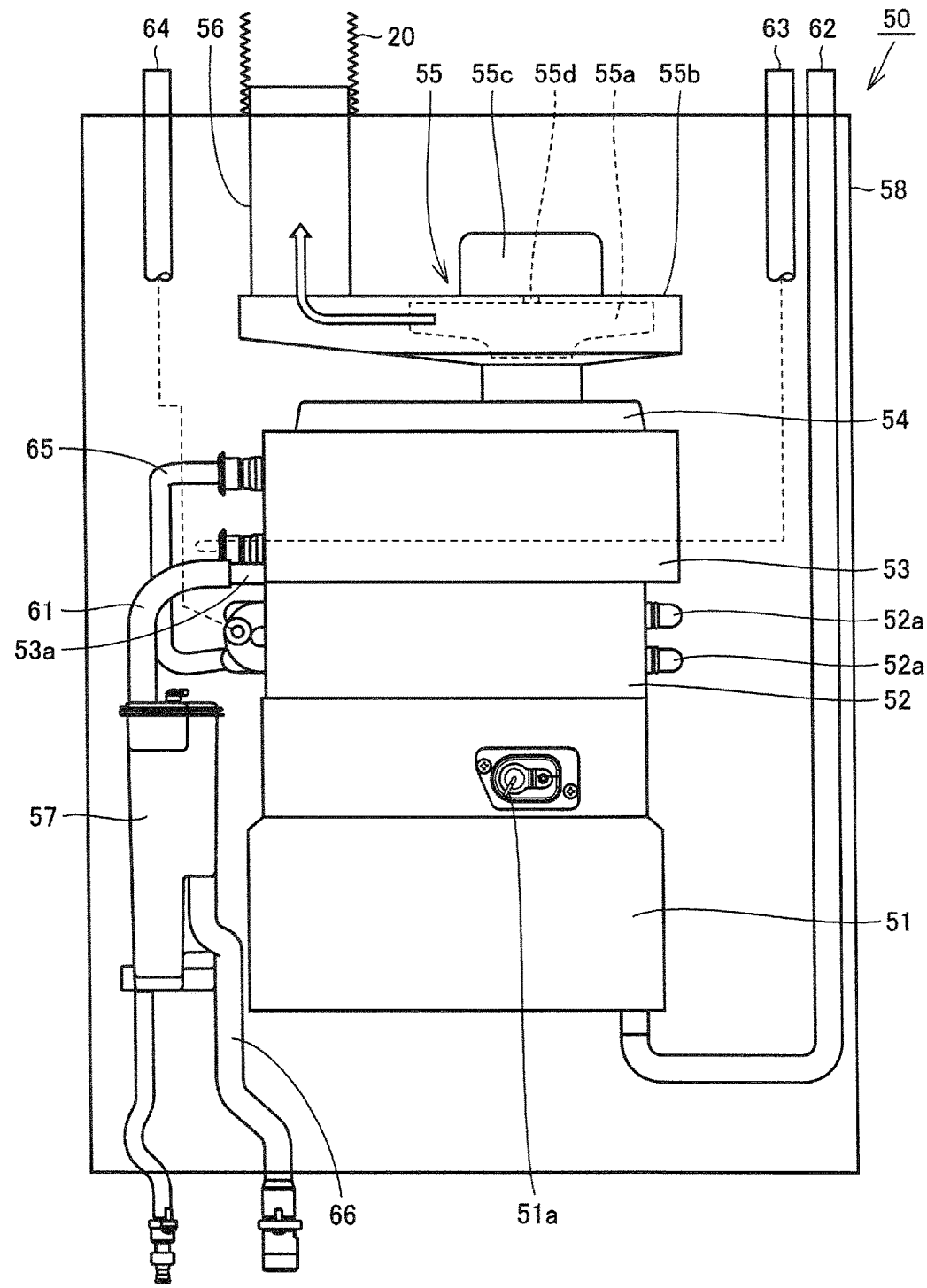
FIG. 3 is a front view schematically showing a construction of a combustion apparatus included in the exhaust structure for combustion apparatus in the first embodiment of the present invention.
Figure 4:
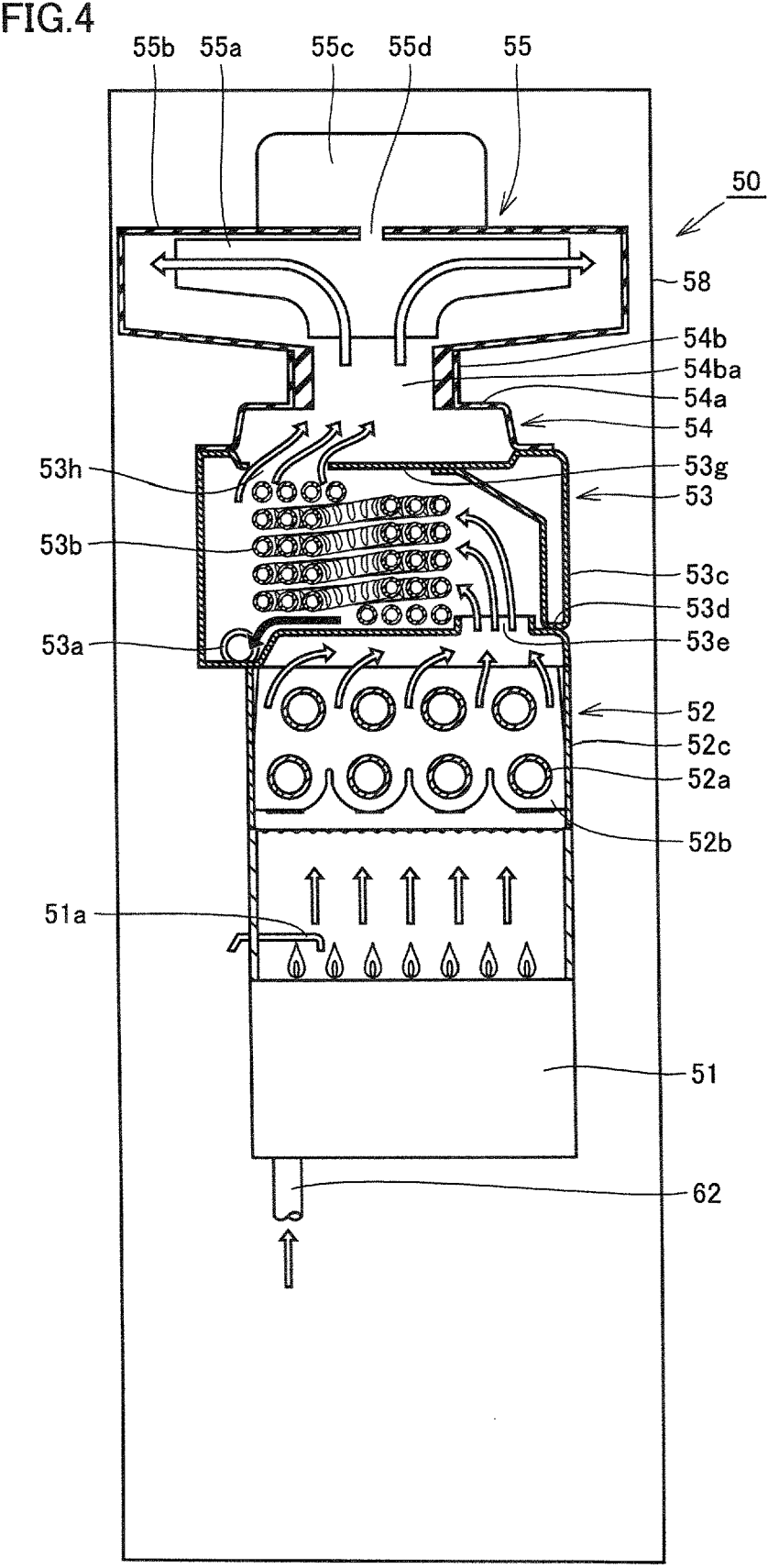
FIG. 4 is a partial side cross-sectional view schematically showing the construction of the combustion apparatus shown in FIG. 3.

Referring to FIGS. 3 and 4, combustion apparatus 50 mainly has a burner 51, a primary heat exchanger 52, a secondary heat exchanger 53, an exhaust box 54, a fan 55, a connection pipe 56, a drainage water tank 57, a housing 58, and pipes 61 to 66.

Burner 51 serves to produce a combustion gas by burning a fuel gas. A gas supply pipe 62 is connected to burner 51. This gas supply pipe 62 serves to supply a fuel gas to burner 51. A gas valve (not shown) implemented, for example, by an electromagnetic valve is attached to this gas supply pipe 62.

A spark plug 51a is arranged above burner 51. This spark plug 51a serves to ignite an air fuel mixture injected from burner 51 to thereby produce a flame, by generating sparks between the plug and a target (not shown) provided in burner 51 by activating an ignition device (an igniter). Burner 51 generates a quantity of heat by burning a fuel gas supplied from gas supply pipe 62 (which is called a combustion operation).

Primary heat exchanger 52 is a heat exchanger of a sensible heat recovery type. This primary heat exchanger 52 mainly has a plurality of plate-shaped fins 52b, a heat conduction pipe 52a penetrating the plurality of plate-shaped fins 52b, and a case 52c accommodating fins 52b and heat conduction pipe 52a. Primary heat exchanger 52 exchanges heat with the combustion gas generated by burner 51, and specifically, it serves to heat water which flows through heat conduction pipe 52a of primary heat exchanger 52 with the quantity of heat generated as a result of the combustion operation of burner 51.

Secondary heat exchanger 53 is a heat exchanger of a latent heat recovery type. This secondary heat exchanger 53 is located downstream of primary heat exchanger 52 in a flow of the combustion gas and connected in series with primary heat exchanger 52. Since combustion apparatus 50 according to the present embodiment thus has secondary heat exchanger 53 of a latent heat recovery type, it is implemented by a water heater of the latent heat recovery type.

Secondary heat exchanger 53 mainly has a drainage water discharge port 53a, a heat conduction pipe 53b, a sidewall 53c, a bottom wall 53d, and an upper wall 53g. Heat conduction pipe 53b is layered as it is spirally wound. Sidewall 53c, bottom wall 53d, and upper wall 53g are arranged to surround heat conduction pipe 53b.

In secondary heat exchanger 53, water which flows through heat conduction pipe 53b is pre-heated (heated) through heat exchange with the combustion gas of which heat has been exchanged in primary heat exchanger 52. As a temperature of the combustion gas is lowered to approximately 60° C. through this process, moisture contained in the combustion gas is condensed so that latent heat can be obtained. In addition, latent heat is recovered in secondary heat exchanger 53 and moisture contained in the combustion gas is condensed, whereby drainage water is produced.

Bottom wall 53d serves as a partition between primary heat exchanger 52 and secondary heat exchanger 53, and it also serves as an upper wall of primary heat exchanger 52. This bottom wall 53d is provided with an opening portion 53e, and this opening portion 53e allows communication between a space where heat conduction pipe 52a of primary heat exchanger 52 is arranged and a space where heat conduction pipe 53b of secondary heat exchanger 53 is arranged. As shown with hollow arrows in FIG. 4, the combustion gas can flow from primary heat exchanger 52 to secondary heat exchanger 53 through opening portion 53e. In this embodiment, for the sake of simplification, bottom wall 53d of secondary heat exchanger 53 and the upper wall of primary heat exchanger 52 are common, however, an exhaust collection and guide member may be connected between primary heat exchanger 52 and secondary heat exchanger 53.

Upper wall 53g is provided with an opening portion 53h, and this opening portion 53h allows communication between the space where heat conduction pipe 53b of secondary heat exchanger 53 is arranged and an internal space in exhaust box 54. As shown with hollow arrows in FIG. 4, the combustion gas can flow from secondary heat exchanger 53 into the internal space in exhaust box 54 through opening portion 53h.

Drainage water discharge port 53a is provided in sidewall 53c or bottom wall 53d. This drainage water discharge port 53a opens at a lowest position in the space surrounded by sidewall 53c, bottom wall 53d, and upper wall 53g (a lowermost position in a vertical direction in a state of placement of the water heater), which is lower than a lowermost portion of heat conduction pipe 53b. Thus, drainage water produced in secondary heat exchanger 53 can be guided to drainage water discharge port 53a along bottom wall 53d and sidewall 53c as shown with a black arrow in FIG. 4.

Exhaust box 54 forms a path for a flow of the combustion gas between secondary heat exchanger 53 and fan 55. This exhaust box 54 can guide the combustion gas of which heat has been exchanged in secondary heat exchanger 53 to fan 55. Exhaust box 54 is attached to secondary heat exchanger 53 and located downstream of secondary heat exchanger 53 in the flow of the combustion gas.

Exhaust box 54 mainly has a box main body 54a and a fan connection portion 54b. An internal space in box main body 54a communicates with the internal space where heat conduction pipe 53b of secondary heat exchanger 53 is arranged through opening portion 53h in secondary heat exchanger 53. Fan connection portion 54b is provided so as to protrude from an upper portion of box main body 54a. This fan connection portion 54b has, for example, a cylindrical shape, and an internal space 54ba thereof communicates with the internal space in box main body 54a.

Fan 55 serves to emit the combustion gas (of which heat has been exchanged in secondary heat exchanger 53) which has passed through secondary heat exchanger 53 to the outside of combustion apparatus 50 by suctioning the combustion gas. This fan 55 is located downstream of exhaust box 54 and secondary heat exchanger 53 in the flow of the combustion gas. Namely, in combustion apparatus 50, burner 51, primary heat exchanger 52, secondary heat exchanger 53, exhaust box 54, and fan 55 are disposed in this order from upstream to downstream in the flow of the combustion gas produced in burner 51. Since the combustion gas is suctioned and exhausted by means of fan 55 as above in this arrangement, combustion apparatus 50 in the present embodiment is the water heater adapted to the exhaust suction and combustion system.

Fan 55 mainly has a rotor 55a, a fan case 55b, a drive source 55c, and a rotation shaft 55d. Fan case 55b is attached to fan connection portion 54b of exhaust box 54 such that an internal space in fan case 55b and the internal space in fan connection portion 54b communicate with each other. Thus, as shown with hollow arrows in FIG. 4, the combustion gas can be suctioned from box main body 54a of exhaust box 54 through fan connection portion 54b into fan case 55b.

Rotor 55a is arranged in fan case 55b. This rotor 55a is connected to drive source 55c with rotation shaft 55d being interposed. Thus, rotor 55a is provided with drive force from drive source 55c and can rotate around rotation shaft 55d. With rotation of rotor 55a, the combustion gas in exhaust box 54 can be suctioned from an inner circumferential side of rotor 55a and can be emitted toward an outer circumferential side of rotor 55a.

Connection pipe 56 is connected to a region within fan case 55b, on the outer circumferential side of a region where rotor 55a is arranged. Therefore, the combustion gas emitted to the outer circumferential side of rotor 55a by rotor 55a of fan 55 can be emitted into exhaust tube 20 through connection pipe 56.

The combustion gas produced by burner 51 is suctioned by fan 55 with rotation of rotor 55a above, so that the combustion gas can reach fan 55 after passage through primary heat exchanger 52, secondary heat exchanger 53, and exhaust box 54 in this order as shown with the hollow arrows in FIG. 4 and can be exhausted to the outside of combustion apparatus 50.

Drainage water tank 57 serves to store drainage water produced in secondary heat exchanger 53. This drainage water tank 57 is connected to secondary heat exchanger 53 through pipe 61. Pipe 61 is connected to drainage water discharge port 53a of secondary heat exchanger 53. Thus, the drainage water produced in secondary heat exchanger 53 can be discharged to drainage water tank 57. Pipe 66 extending to the outside of combustion apparatus 50 is connected to drainage water tank 57. The drainage water stored in drainage water tank 57 can be discharged to the outside of combustion apparatus 50 through this pipe 66.

This drainage water tank 57 has a water seal structure. Namely, drainage water tank 57 has such a structure that, as a prescribed amount of drainage water is stored in drainage water tank 57, the stored drainage water cannot allow air to pass through drainage water tank 57. With such a water seal structure of drainage water tank 57, entry of air outside combustion apparatus 50 (outside air) into combustion apparatus 50 (secondary heat exchanger 53) through drainage water tank 57 via pipe 66 can be prevented.

Water supply pipe 63 is connected to one end of heat conduction pipe 53b of secondary heat exchanger 53 and hot water delivery pipe 64 is connected to one end of heat conduction pipe 52a of primary heat exchanger 52. The other end of heat conduction pipe 52a of primary heat exchanger 52 and the other end of heat conduction pipe 53b of secondary heat exchanger 53 are connected to each other through connection pipe 65. Each of gas supply pipe 62, water supply pipe 63, and hot water delivery pipe 64 leads to the outside, for example, in a top portion of combustion apparatus 50. Burner 51, primary heat exchanger 52, secondary heat exchanger 53, exhaust box 54, fan 55, and drainage water tank 57 are arranged in housing 58.

(Cutting Guide)

A construction of a cutting guide in the present embodiment will now be described with reference to FIGS. 5 and 6. A cutting guide 1 in the present embodiment is a jig used in installing exhaust tube 20 of exhaust structure for combustion apparatus 100.

Figure 5:
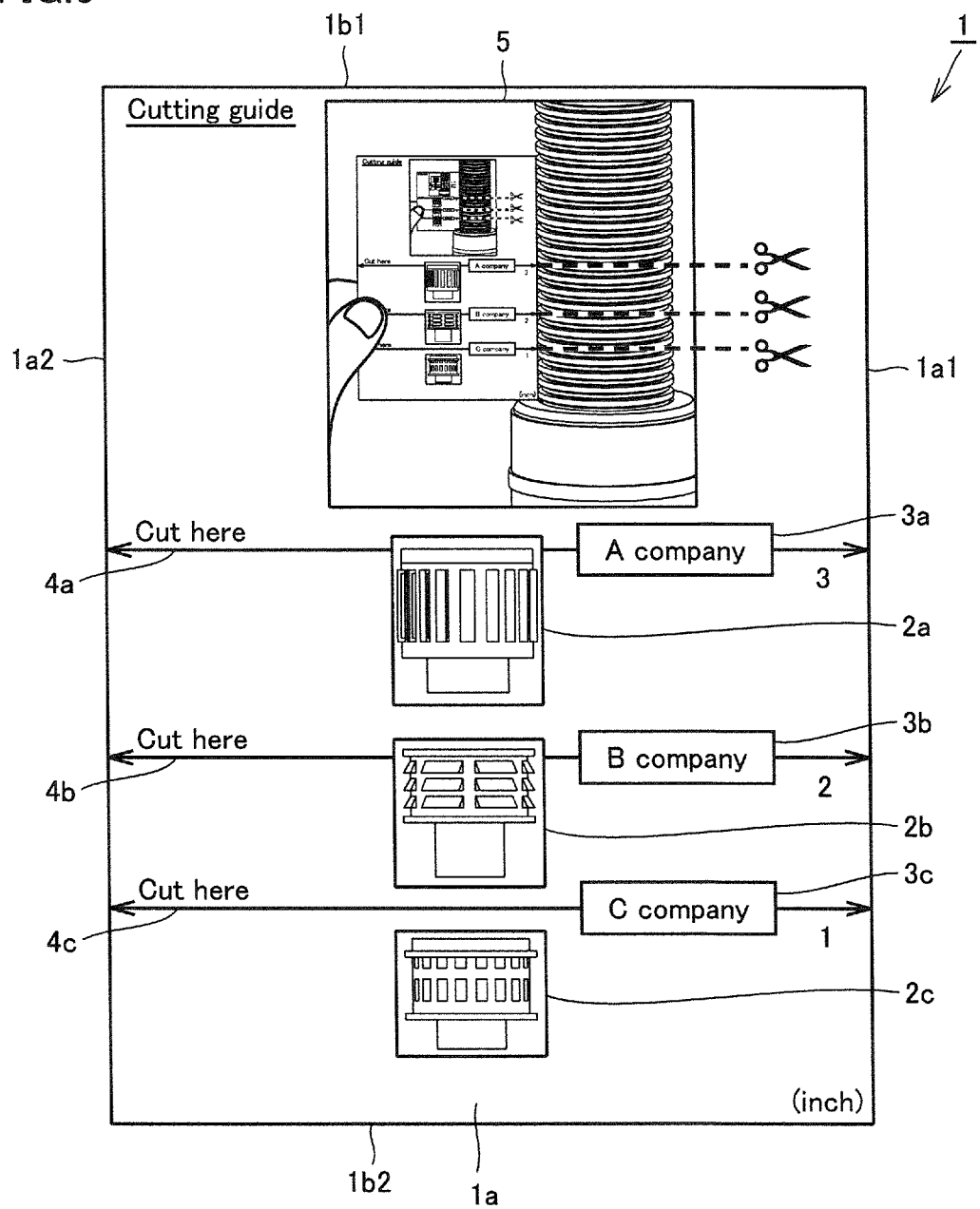
FIG. 5 is a front view schematically showing a cutting guide in the first embodiment of the present invention.
Figure 6:
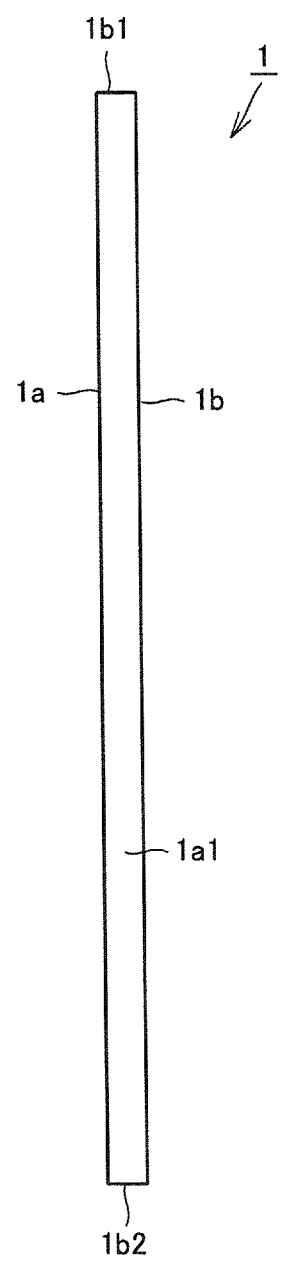
FIG. 6 is a side view schematically showing the cutting guide in the first embodiment of the present invention.

Referring to FIGS. 5 and 6, cutting guide 1 has, for example, a rectangular sheet member. The rectangular sheet member mainly has end portions 1a1 and 1a2 opposed to each other, end portions (sides) 1b1 and 1b2 opposed to each other and intersecting with end portions 1a1 and 1a2, a front surface 1a surrounded by end portions (sides) 1a1, 1a2, 1b1, and 1b2, and a back surface 1b opposite to front surface 1a. In the present embodiment, end portion 1b2 is a reference site for alignment with an upper surface of the end portion of exhaust pipe unit 310 on the outdoor side during use of the cutting guide, and at least any one of end portions 1a1 and 1a2 is another side for alignment with the outer circumferential surface of exhaust tube 20 protruding from the end portion of exhaust pipe unit 310 on the outdoor side.

On front surface 1a of cutting guide 1, illustrations 2a to 2c corresponding to rain caps (exhaust terminals) of respective manufacturers are shown, and characters 3a to 3c representing manufacturer names are shown next to illustrations 2a to 2c, respectively. In addition, arrows 4a to 4c indicating cutting positions adapted to exhaust terminals which are shown in illustrations 2a to 2c, respectively, are shown. Furthermore, how to use cutting guide 1 is shown in an upper portion in a picture on front surface 1a. Illustrations 2a to 2c may be photographs instead, and characters 3a to 3c may be photographs or illustrations of logos of manufacturer names instead. Arrows 4a to 4c may also be an indication other than the arrow, such as a straight line. How to use cutting guide 1 may be shown also in a photograph or an illustration.

As shown in FIG. 5, each indication on front surface 1a is arranged to allow easy understanding by a worker that arrows 4a to 4c indicate cutting positions of exhaust tube 20 adapted to exhaust terminals, which are shown in illustrations 2a to 2c, respectively. For example, illustration 2a and character 3a are arranged over arrow 4a, and illustration 2b and character 3b are arranged over arrow 4b. Character 3c is arranged over arrow 4c and illustration 2c is arranged directly under arrow 4c. Such arrangement is not limited as shown in FIG. 5, and arrangement should only be such that a worker can intuitively and easily understand that arrows 4a to 4c indicate cutting positions adapted to an exhaust terminal shown in illustrations 2a to 2c, respectively. In other words, indications essential on front surface 1a of cutting guide 1 are arrows 4a to 4c and other indications are for easy understanding by a worker of meaning of arrows 4a to 4c.

A material for cutting guide 1 is not particularly restricted, and paper, plastics, or a wooden board can be employed. At least front surface 1a of cutting guide 1 is preferably waterproofed. Here, "front surface 1a being waterproofed" means that each indication on front surface 1a does not smear due to water such as raindrops. Therefore, for example, front surface 1a may be waterproofed by application of a water repellent material to front surface 1a, or a sealing member such as a plastic film or a silicon seal may be provided on front surface 1a. In a case that an installation method which will be described later is performed in wet weather, waterproof treatment of front surface 1a can prevent interference with installation due to smear of an indication. Furthermore, the entire cutting guide 1 may be subjected to high waterproof treatment having waterproofness to such an extent as not allowing permeation of water. For example, by covering the entire cutting guide 1 made of paper or lumber with a sealing member or by coating the same with a material not allowing permeation of water, the entire cutting guide 1 can have waterproofness to such an extent as not allowing permeation of water.

(Method of Installing Exhaust Tube)

A method of installing exhaust tube 20 in the present embodiment will now be described with reference to FIGS. 7 to 13 and 2.

Figure 8:
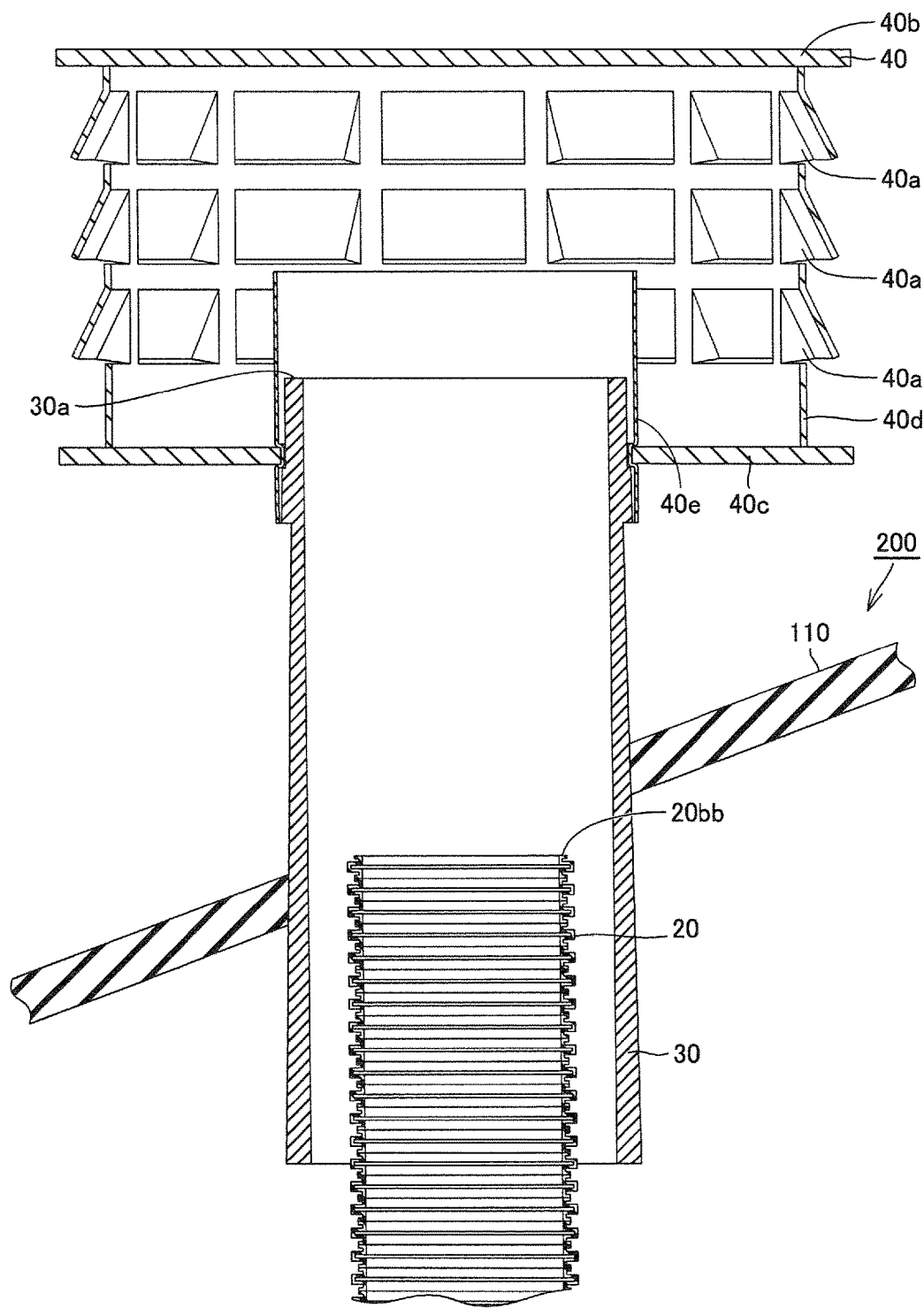
Figure 9:
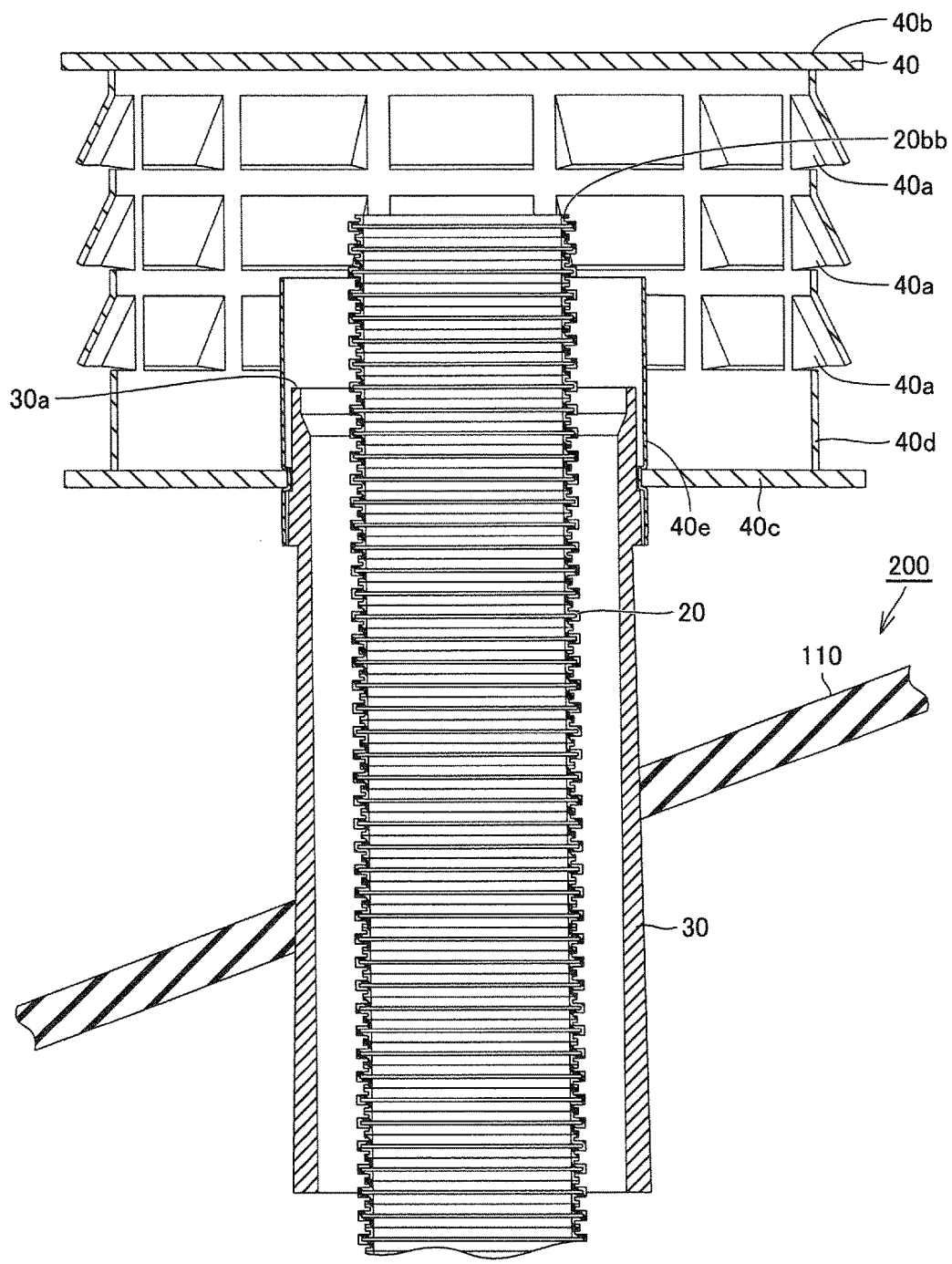

Referring to FIG. 7, exhaust pipe 30 has been placed through roof 110 of building 200 so as to communicate from the inside to the outside of building 200. Exhaust terminal 40 is attached to a tip end portion (around an upper end surface 30a) of this exhaust pipe 30 on the outdoor side. In this state, exhaust tube 20 is prepared. Referring to FIG. 8, exhaust tube 20 is introduced in exhaust pipe 30 from a side of the other end portion 20bb of exhaust tube 20, and the side of the other end portion 20bb of exhaust tube 20 is pushed from the indoor side toward the outdoor side of exhaust pipe 30. Referring to FIG. 9, exhaust tube 20 is introduced in exhaust pipe 30 until the other end portion 20bb of exhaust tube 20 protrudes from upper end surface 30a of exhaust pipe 30 and comes in contact with an inner surface of ceiling wall 40b of exhaust terminal 40 (a first step: the step of introducing an exhaust tube).

Thereafter, one end portion 20a of exhaust tube 20 is connected to a combustion apparatus (connection pipe 56 of combustion apparatus 50: FIG. 3). The other end portion 20bb is different from the other end portion 20b in FIG. 1.

Figure 10:
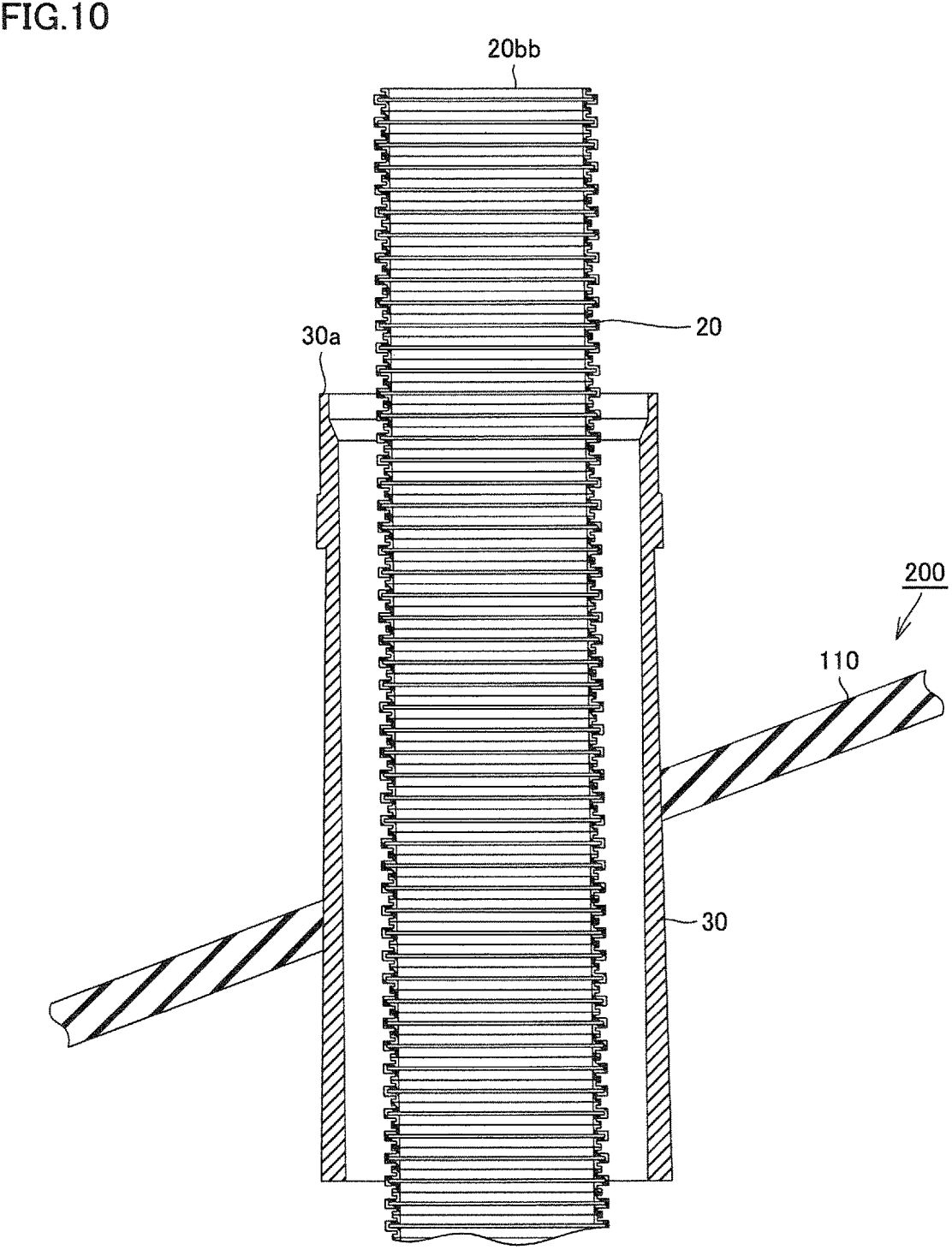
FIG. 10 is a cross-sectional view schematically showing a second step of the method of installing an exhaust tube in the first embodiment of the present invention.

Referring to FIG. 10, then, exhaust terminal 40 is removed from exhaust pipe 30 (a second step: the step of removing an exhaust terminal).

Figure 11:
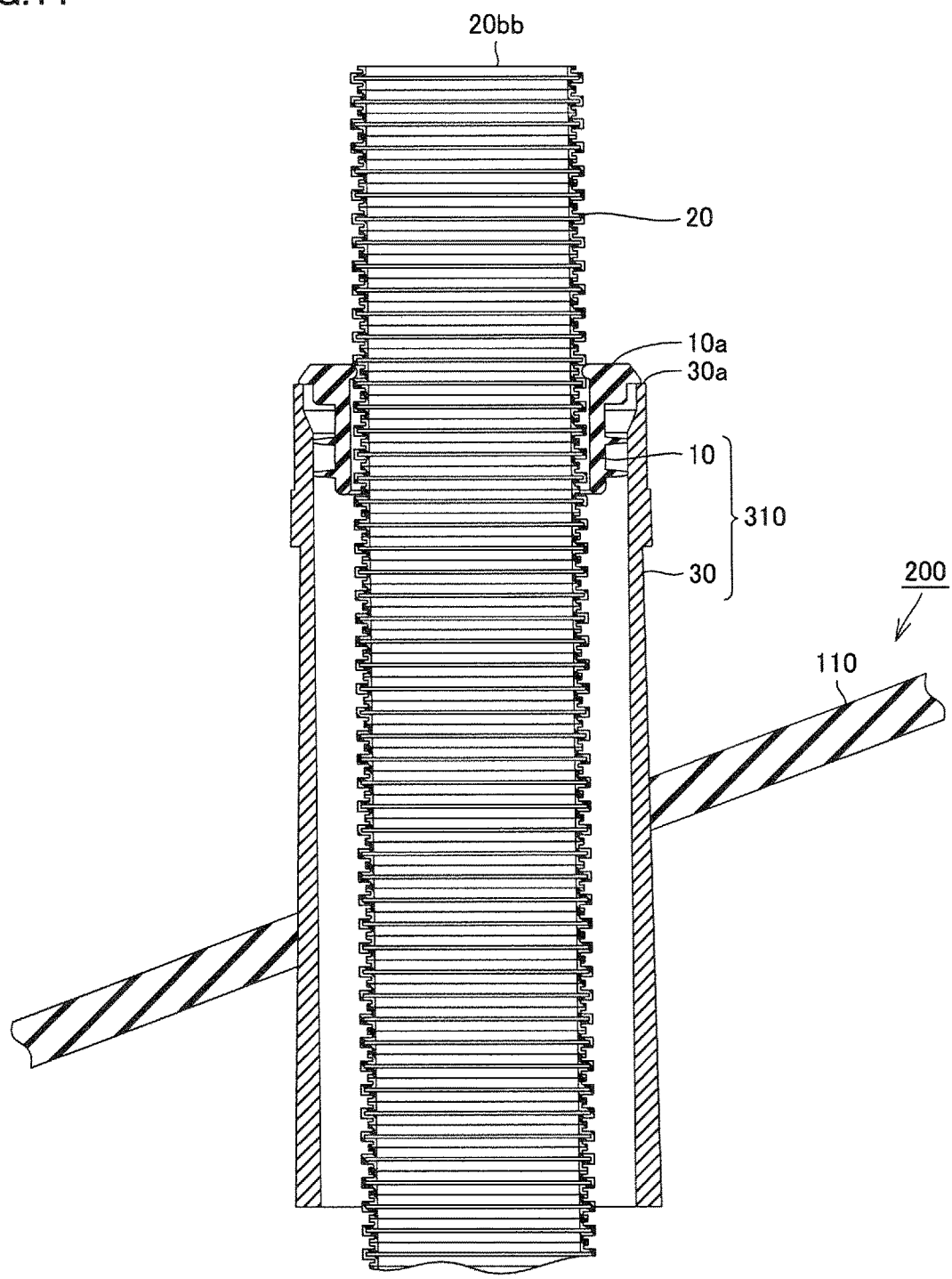
FIG. 11 is a cross-sectional view schematically showing a third step of the method of installing an exhaust tube in the first embodiment of the present invention.

Referring to FIG. 11, then, exhaust adapter 10 is fitted to the outer circumferential surface of exhaust tube 20 (a third step: the step of attaching an exhaust adapter).

Figure 12:
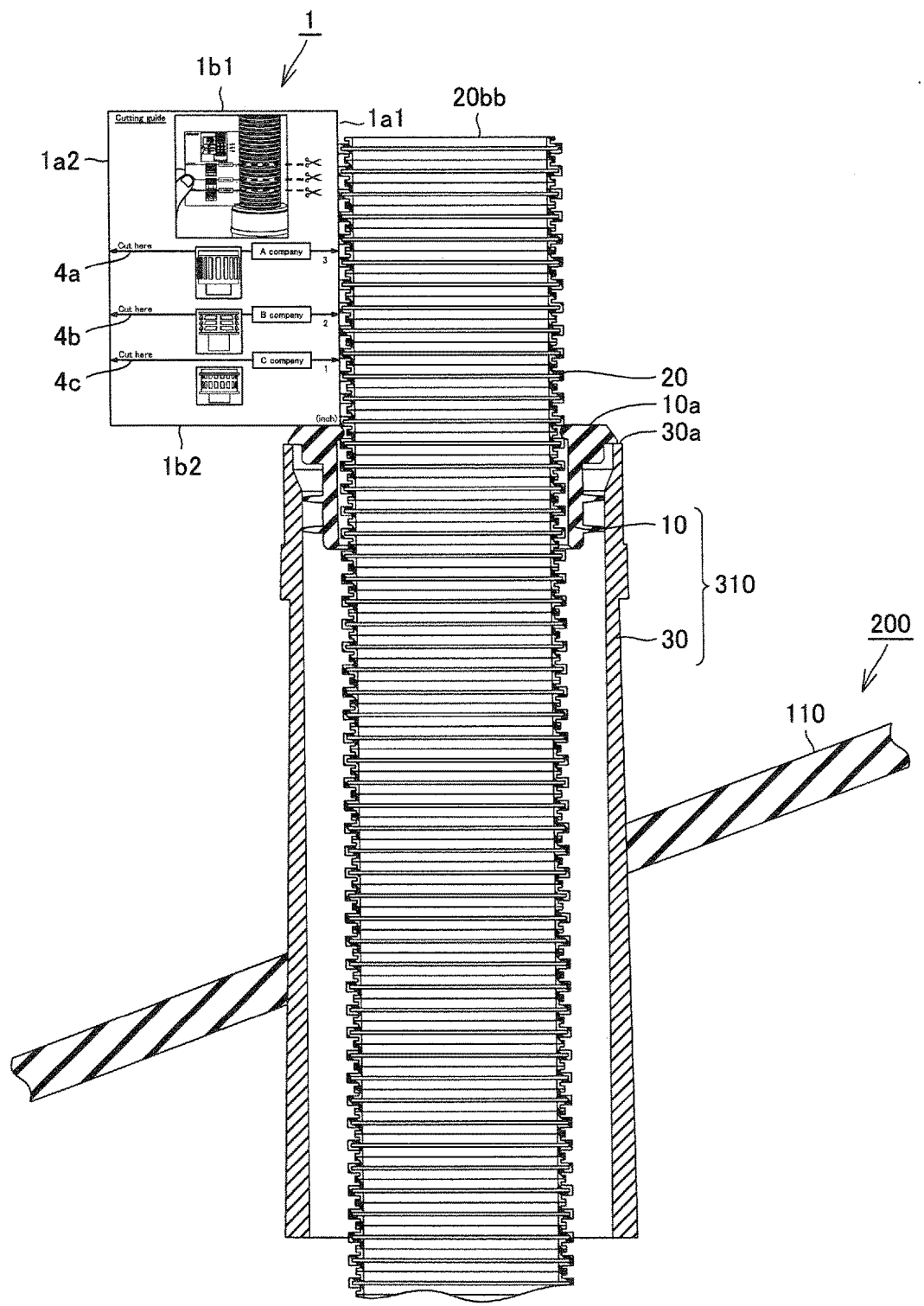
FIGS. 12 and 13 are cross-sectional views schematically showing a fourth step of the method of installing an exhaust tube in the first embodiment of the present invention.

Referring to FIG. 12, then, end portion 1b2 which is the reference site of cutting guide 1 is aligned with the upper surface of the end portion of exhaust pipe unit 310 on the outdoor side. Furthermore, end portion 1a1 is aligned with the outer circumferential surface of exhaust tube 20 protruding from the end portion of exhaust pipe unit 310 on the outdoor side. Here, cutting guide 1 is arranged such that a direction of extension of end portion 1a1 matches with a direction of extension of exhaust tube 20.

Here, the upper surface of the end portion of exhaust pipe unit 310 on the outdoor side means a surface at a height position closer to a height position of the end surface of the other end portion 20bb of exhaust tube 20, of upper surface 10a of exhaust adapter 10 and upper end surface 30a of exhaust pipe 30. In the present embodiment, the height position of upper surface 10a is closer to the height position of the end surface of the other end portion 20bb than the height position of upper end surface 30a. Therefore, upper surface 10a is defined as the upper surface of the end portion of exhaust pipe unit 310 on the outdoor side in the present embodiment.

Figure 13:
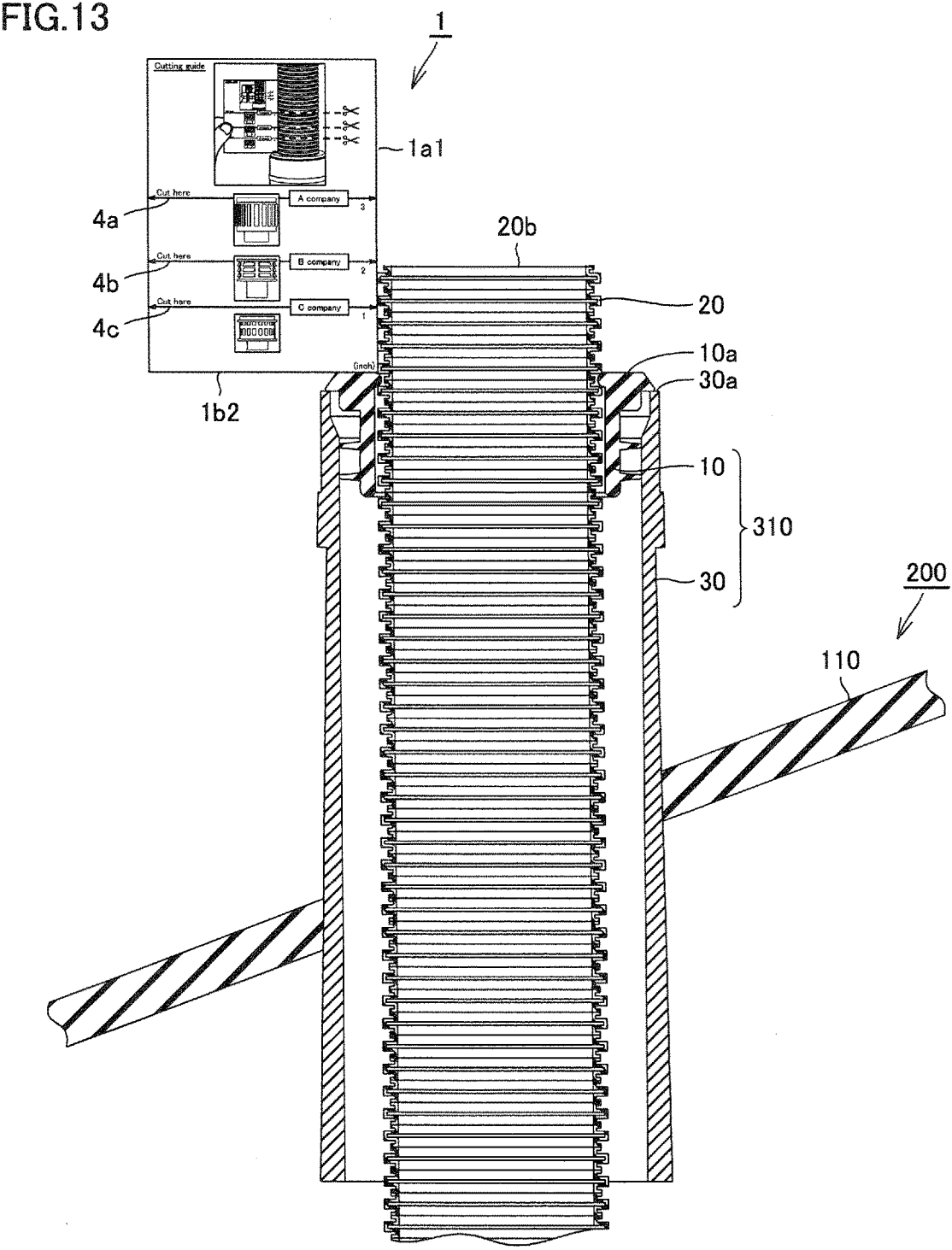

Referring to FIG. 13, then, exhaust tube 20 protruding from the end portion of exhaust pipe 30 on the outdoor side is cut at a prescribed position. Scissors or nippers can be used for cutting exhaust tube 20. The other end portion of exhaust tube 20 newly formed as a result of cutting of the other end portion side of exhaust tube 20 is the other end portion 20b shown in FIG. 1.

A prescribed position of cutting of exhaust tube 20 is determined by a shape of exhaust terminal 40. Namely, in a case that a rain cap illustrated in illustration 2a serves as exhaust terminal 40, exhaust tube 20 is cut at a position meeting an extension of arrow 4a. In a case that a rain cap illustrated in illustration 2b serves as exhaust terminal 40, exhaust tube 20 is cut at a position meeting an extension of arrow 4b. In a case that a rain cap illustrated in illustration 3c serves as exhaust terminal 40, exhaust tube 20 is cut at a position meeting an extension of arrow 4c. In the present embodiment, since exhaust terminal 40 corresponds to a rain cap illustrated in illustration 3b, exhaust tube 20 is cut at a position meeting an extension of arrow 4b (a fourth step: the step of cutting an exhaust tube).

In the fourth step, a worker can put a mark on exhaust tube 20 at a position meeting the extension of arrow 4b with one hand while he/she holds cutting guide 1 with another hand. Then, the worker can place cutting guide 1, for example, on a roof and cut exhaust tube 20 along the mark put on exhaust tube 20 with his/her both hands.

Referring to FIG. 2, then, exhaust terminal 40 is again attached to exhaust pipe 30 (a fifth step: the step of attaching again an exhaust terminal). As above, installation of exhaust tube 20 in the present embodiment is completed.

Though one end portion 20a of exhaust tube 20 is connected to the combustion apparatus after the first step and before the second step, one end portion 20a of exhaust tube 20 may be connected to the combustion apparatus after the fifth step.

Function and Effect

A function and effect of the present embodiment will now be described.

If installation is carried out such that a length of exhaust tube 20 protruding from exhaust pipe unit 310 is adapted to exhaust terminal 40 without using cutting guide 1, at least a procedure as follows will be required.

Initially, a worker checks a type of already-provided exhaust terminal 40 and then checks a length of exhaust tube 20 adapted to exhaust terminal 40 in an installation manual. Then, the worker performs the first, second, and third steps in the present embodiment described above, thereafter accurately applies a ruler or a measuring tape to exhaust pipe unit 310, reads a scale corresponding to a length adapted to a type of exhaust terminal 40, and puts a mark on the outer circumferential surface of exhaust tube 20 located on an extension of the read scale. Then, exhaust tube 20 is cut at a position of the put mark. Such an operation is performed outdoors, that is, on a roof, and hence great burden is imposed on the worker.

According to the present embodiment, by using a cutting guide, it is not necessary to check a length of exhaust tube 20 adapted to exhaust terminal 40 in the installation manual, and such a complicated operation as accurately applying a ruler or a measuring tape to a prescribed position and reading a scale is not performed. After a cutting position adapted to a type of exhaust terminal 40 is easily determined without requiring such an operation, a mark can be put on the outer circumferential surface of exhaust tube 20 located on an extension of any of arrows 4a to 4c. Therefore, use of cutting guide 1 in the present embodiment can facilitate adjustment of a length of exhaust tube 20 in accordance with a type of exhaust terminal 40.

In particular, as shown in FIG. 5, front surface 1a of cutting guide 1 has an indication by means of an illustration, a character, or a graphic representation, so that a cutting position can more intuitively and easily be known. In addition, arrows 4a to 4c are double-headed, which allows appropriate use by any of right-handed and left-handed workers.

As shown in FIG. 5, on front surface 1a of cutting guide 1, a remaining length (a numerical character shown directly under each of arrows 4a to 4c in FIG. 5) of exhaust tube 20 protruding from exhaust pipe unit 310 in cutting at each cutting position may be indicated. Thus, a unit of length of exhaust tube 20 protruding from exhaust pipe unit 310 after cutting can easily be known.

Figure 14:
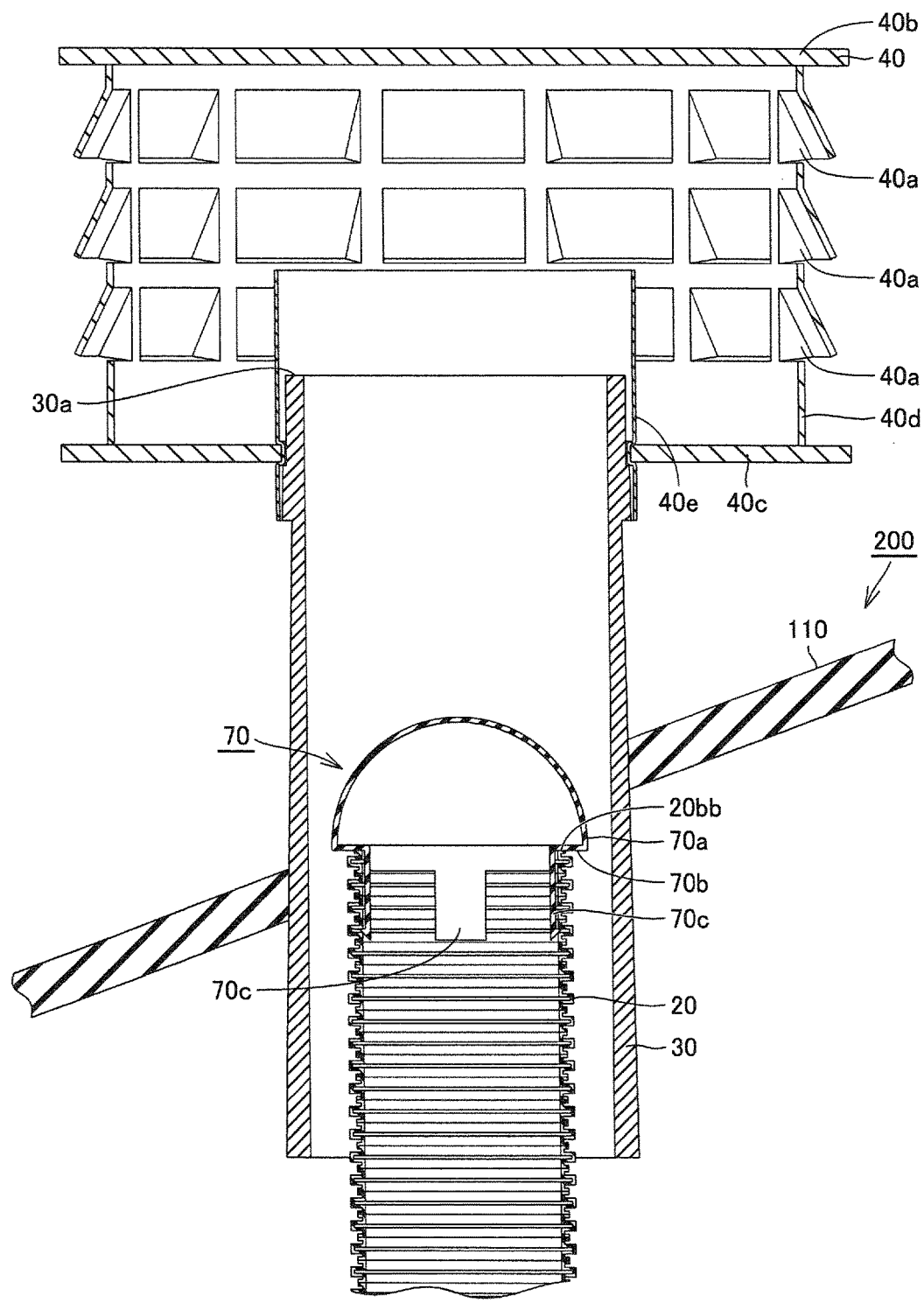
FIG. 14 is a cross-sectional view schematically showing a variation of the first step of the method of installing an exhaust tube in the first embodiment of the present invention.

In a variation of the first step in the installation method described above, an introduction jig 70 as shown in FIG. 14 may be attached to the other end portion 20bb of exhaust tube 20. Referring to FIG. 14, introduction jig 70 is formed by integrally resin molding, for example, a dome portion 70a, a protruding portion 70b, and a support portion 70c. While support portion 70c is introduced in exhaust tube 20, protruding portion 70b protruding from support portion 70c and dome portion 70a connected to protruding portion 70b protrude along the entire circumference in a circumferential direction of the other end portion 20bb of exhaust tube 20. By using introduction jig 70 in the first step, a tip end portion of exhaust tube 20 introduced in exhaust pipe 30 is in a dome shape, so that the other end portion 20bb of exhaust tube 20 is less likely to be caught by the inner circumferential surface of exhaust pipe 30.

Figure 15:
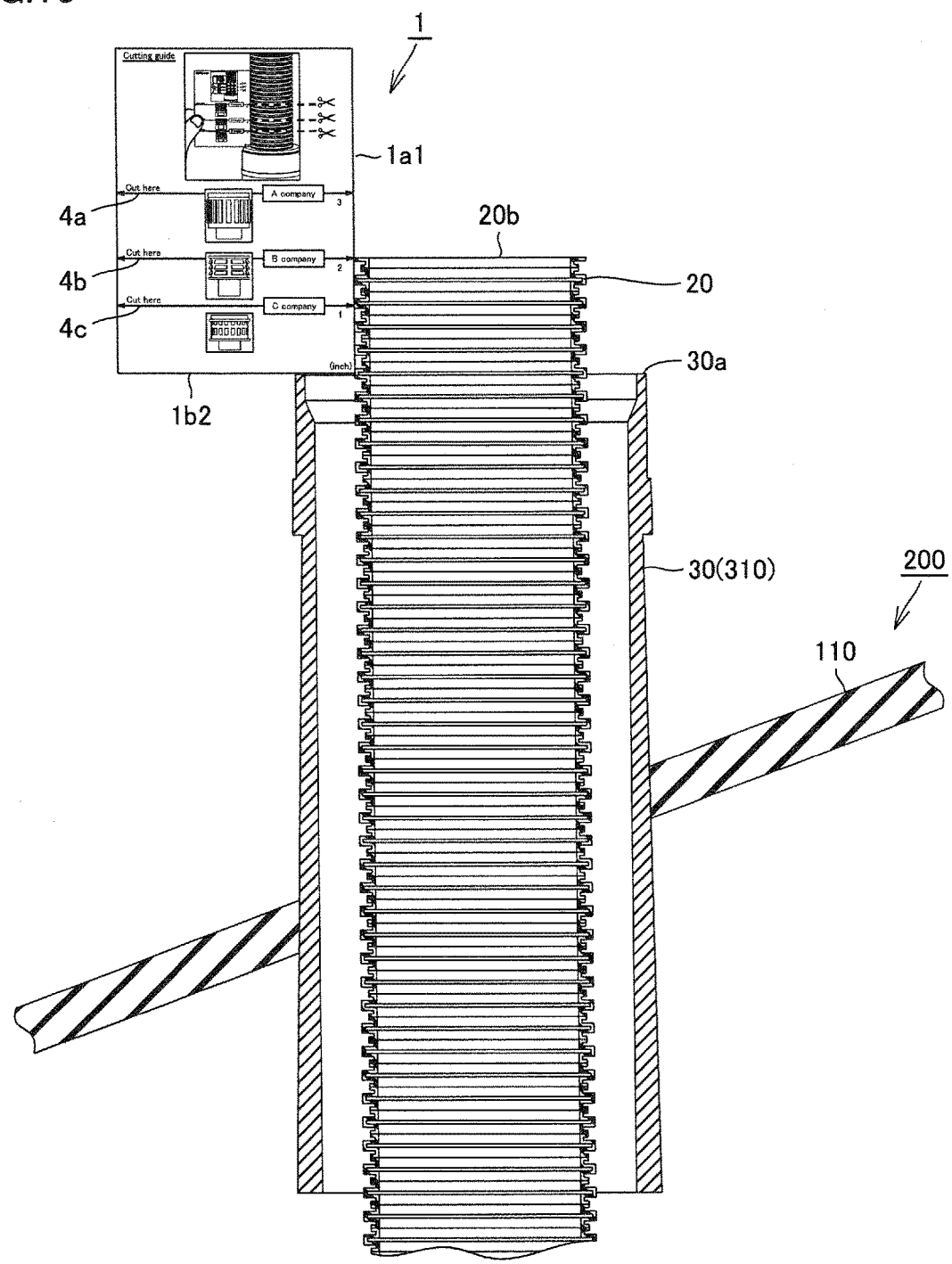
FIG. 15 is a partial cross-sectional view schematically showing a case that the exhaust structure for combustion apparatus in the first embodiment of the present invention does not have an exhaust adapter.

In the exhaust structure for combustion apparatus in the present embodiment, the upper surface of the end portion of exhaust pipe unit 310 on the outdoor side is implemented by upper surface 10a, and end portion 1b2 which is the reference site of cutting guide 1 is aligned with this upper surface 10a. In the variation, however, as shown in FIG. 15, in a case of an exhaust structure for combustion apparatus without exhaust adapter 10, the upper surface of the end portion of exhaust pipe unit 310 on the outdoor side is implemented by upper end surface 30a of exhaust pipe 30.

Figure 16:
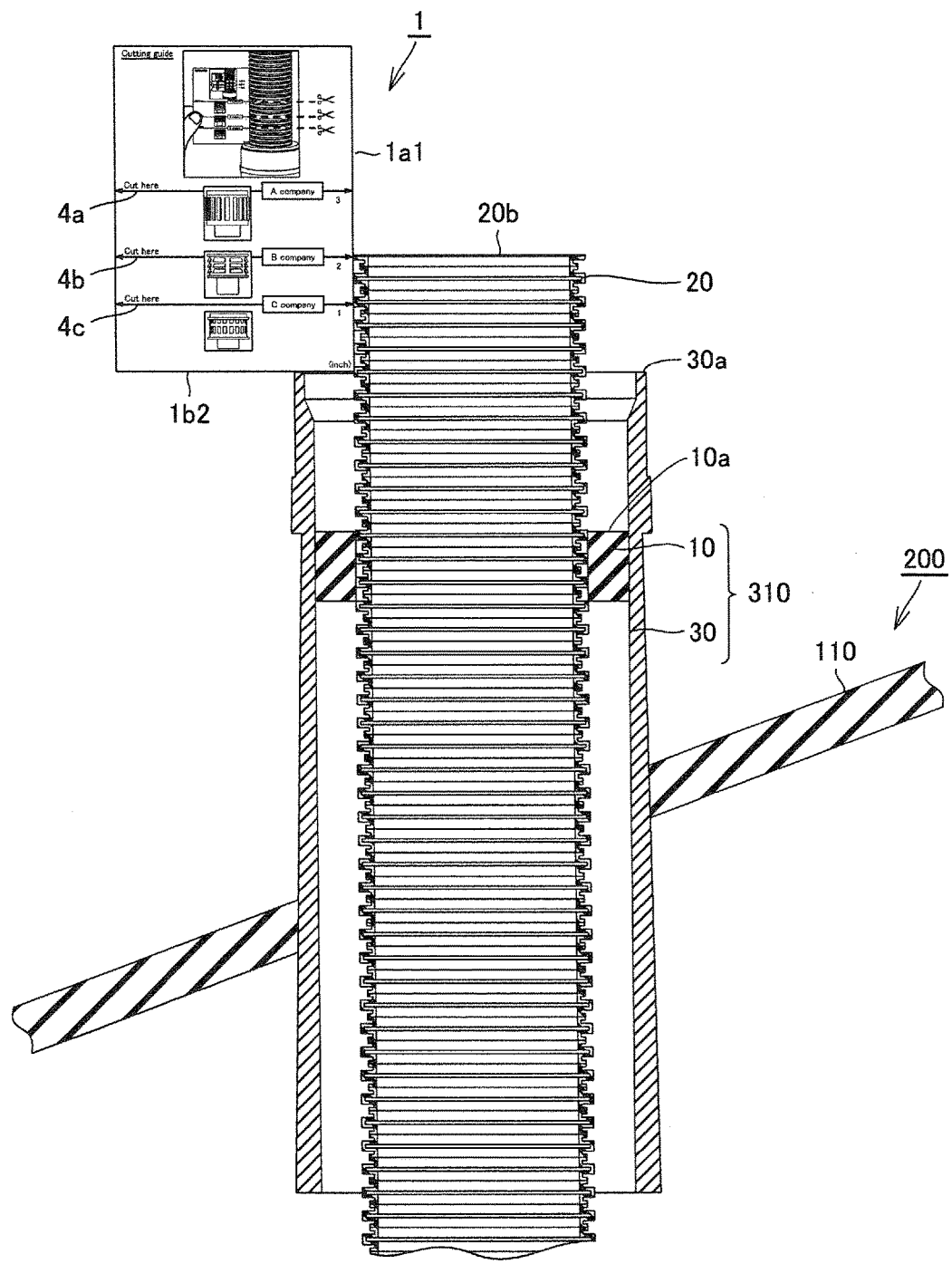
FIG. 16 is a partial cross-sectional view schematically showing a case that the exhaust structure for combustion apparatus in the first embodiment of the present invention has an exhaust adapter in another shape.

Alternatively, as shown in FIG. 16, in a case that exhaust adapter 10 has an annular shape surrounding a through hole, it is attached to the outer circumferential surface of exhaust tube 20 and to the inner circumferential surface of exhaust pipe 30 by introduction of exhaust tube 20 into the through hole, and the entire exhaust adapter 10 is located within exhaust pipe 30 as well, the upper surface of the end portion on the outdoor side of exhaust pipe unit 310 is implemented by upper end surface 30a of exhaust pipe 30.

Figure 17:
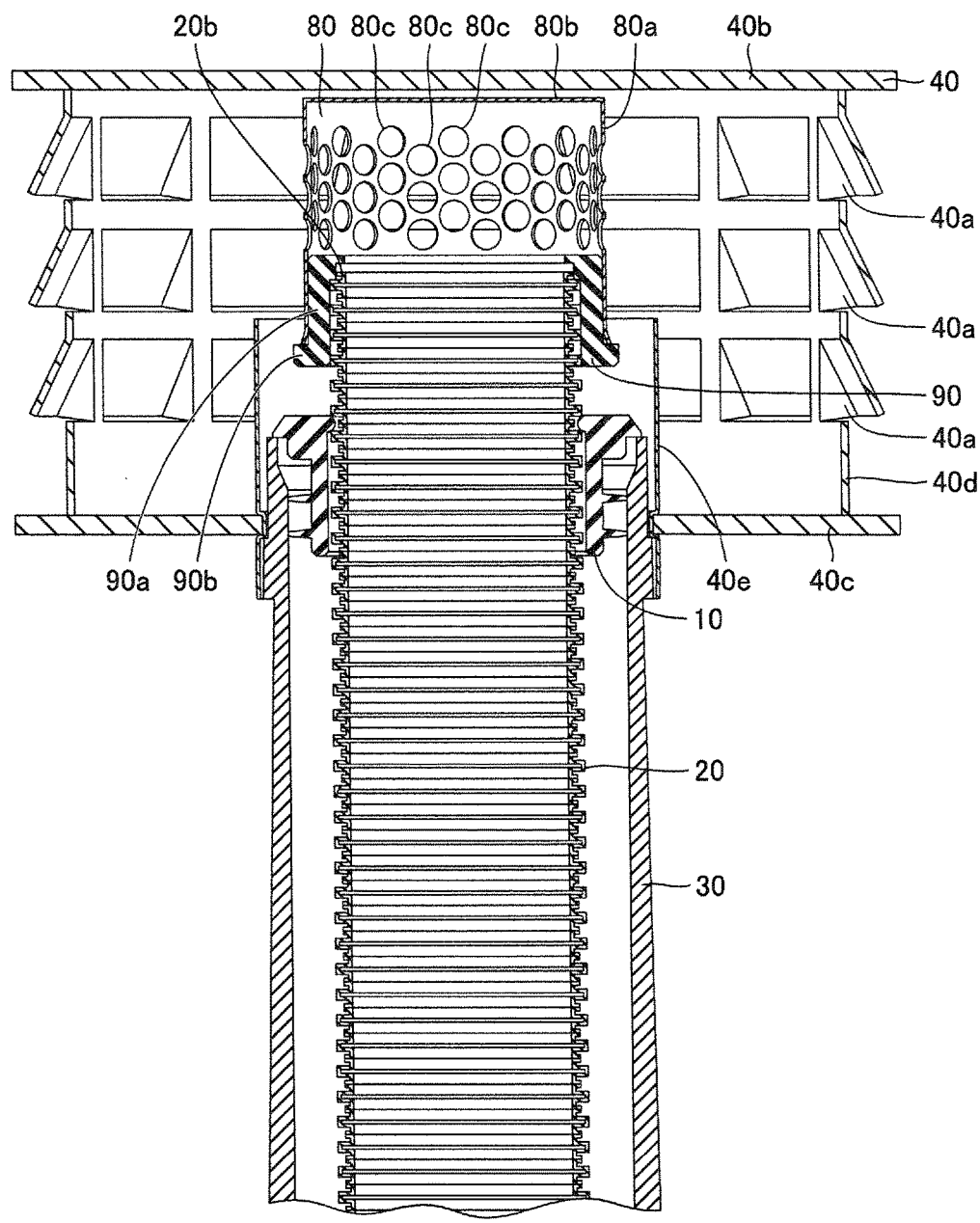
FIG. 17 is a partial cross-sectional view schematically showing a case that the exhaust structure for combustion apparatus in the first embodiment of the present invention further has an exhaust straightening member.

Alternatively, as shown in FIG. 17, the exhaust structure for combustion apparatus in the present embodiment may include yet another member on the other end portion 20b of exhaust tube 20. Specifically, referring to FIG. 17, the exhaust structure for combustion apparatus further has an exhaust straightening member 80 and a holding member 90.

Holding member 90 serves to attach exhaust straightening member 80 to the other end portion 20b of exhaust tube 20 and it is made of a material having elasticity. This holding member 90 has a cylindrical portion 90a and an annular portion 90b. Annular portion 90b is attached to an end portion of cylindrical portion 90a and formed to project toward the outer circumference relative to cylindrical portion 90a. A through hole is formed so as to penetrate both of cylindrical portion 90a and annular portion 90b. As exhaust tube 20 is introduced in the through hole, holding member 90 is fitted to the outer circumferential surface of exhaust tube 20.

Exhaust straightening member 80 is fitted, for example, to the outer circumferential surface of holding member 90. As holding member 90 is fitted to exhaust tube 20 and exhaust straightening member 80 is fitted to holding member 90, exhaust straightening member 80 is attached to the other end portion 20b of exhaust tube 20. This exhaust straightening member 80 has a circumferential wall portion 80a and a lid portion 80b. Circumferential wall portion 80a has a plurality of openings 80c formed for allowing the combustion gas to flow out toward exhaust port 40a of exhaust terminal 40.

The exhaust structure for combustion apparatus in the present embodiment further includes exhaust straightening member 80 and holding member 90 described above, so that corrosion of roof 110 due to condensation of exhaust drainage water in the combustion gas can be suppressed in a case that combustion apparatus 50 is implemented by a water heater of the latent heat recovery type adapted to the exhaust suction and combustion system. This is because the combustion gas exhausted from exhaust straightening member 80 is readily emitted from exhaust port 40a and less likely to impinge on ceiling wall 40b of exhaust terminal 40 and hence occurrence of condensation caused by impingement of the combustion gas on ceiling wall 40b can be suppressed.

When the exhaust structure for combustion apparatus in the present embodiment further includes exhaust straightening member 80 and holding member 90, an appropriate length of exhaust tube 20 protruding from exhaust pipe unit 310 may be different from a case without exhaust straightening member 80 and holding member 90. In this case, a height position from the reference sites indicated by arrows 4a to 4c shown on cutting guide 1 should only be set to a height position taking into account inclusion of exhaust straightening member 80 and holding member 90.

Second Embodiment

A construction of a cutting guide in a second embodiment will be described with reference to FIG. 18.

Figure 18:
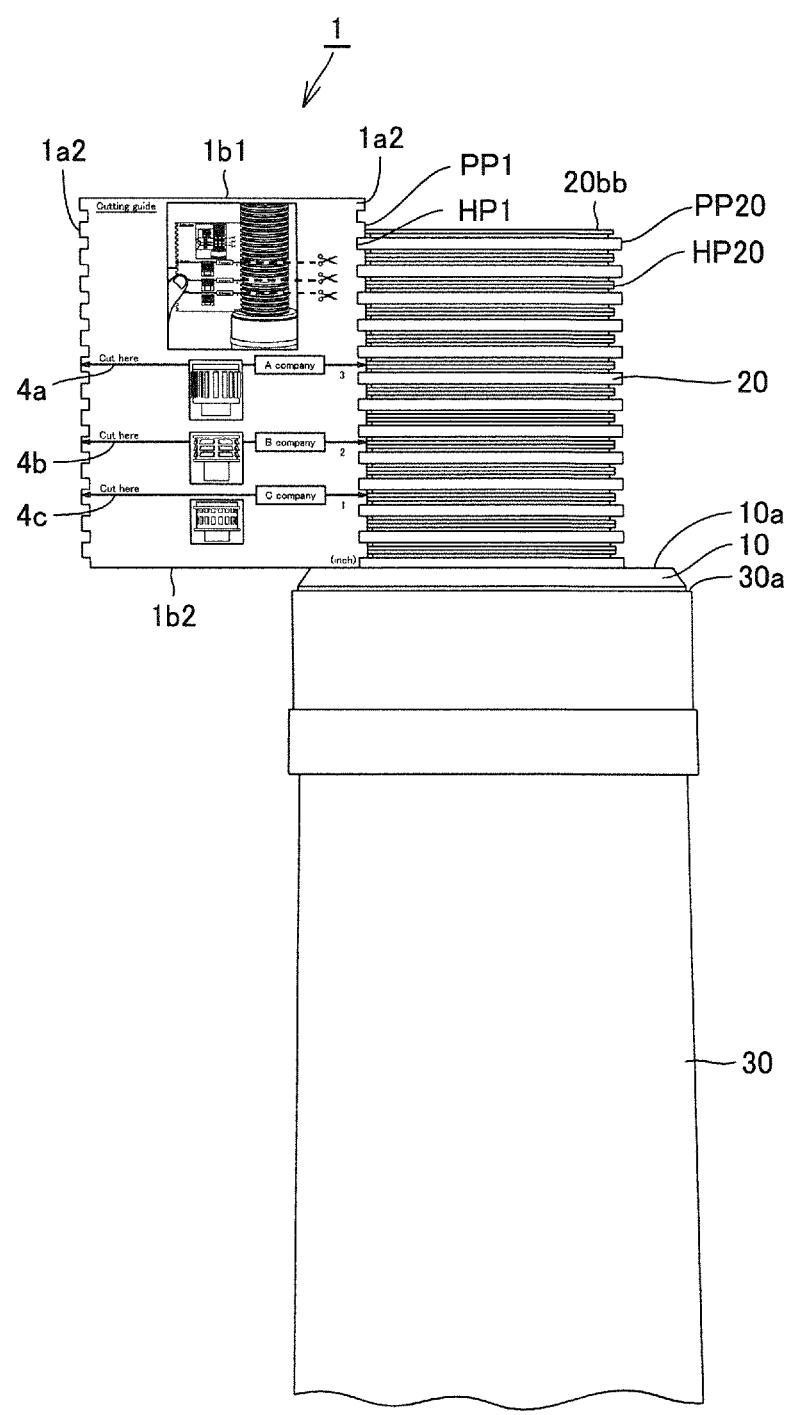
FIG. 18 is a partial side view schematically showing the fourth step in which a cutting guide in a second embodiment of the present invention is employed.

Referring to FIG. 18, cutting guide 1 in the present embodiment is different in construction from cutting guide 1 in the first embodiment in having a shape fitting to a shape of the outer circumferential surface of exhaust tube 20. Specifically, each of end portion 1*a*1 and end portion 1*a*2 has a projecting and recessed shape and such a projecting and recessed shape fits to a projecting and recessed shape of the outer circumferential surface of exhaust tube 20. Namely, a projection PP20 on the outer circumferential surface of exhaust tube 20 can enter a recess HP1 in end portion 1*a*1 (1*a*2), and a projection PP1 on end portion 1*a*1 (1*a*2) can enter a recess HP20 in the outer circumferential surface of exhaust tube 20.

Thus, as shown in FIG. 18, in the fourth step in installing an exhaust tube, a worker can more easily and accurately align end portion 1*a*1 (1*a*2) with the outer circumferential surface of exhaust tube 20.

Alternatively, projection PP20 on the outer circumferential surface of exhaust tube 20 may be engaged with recess HP1 in end portion 1*a*1 (1*a*2) and projection PP1 on end portion 1*a*1 (1*a*2) may be engaged with recess HP20 in the outer circumferential surface of exhaust tube 20. In this case, since cutting guide 1 is fixed to the outer circumferential surface of exhaust tube 20, it is not necessary to hold cutting guide 1 at a prescribed position at the time when a worker cuts exhaust tube 20. Therefore, for example, a mark can more accurately be put on exhaust tube 20.

Though both of end portions 1*a*1 and 1*a*2 are formed in the projecting and recessed shape in the present embodiment, any one of end portions 1*a*1 and 1*a*2 may be formed in the projecting and recessed shape.

Third Embodiment

A construction of a cutting guide in a third embodiment will be described with reference to FIG. 19.

Figure 19:
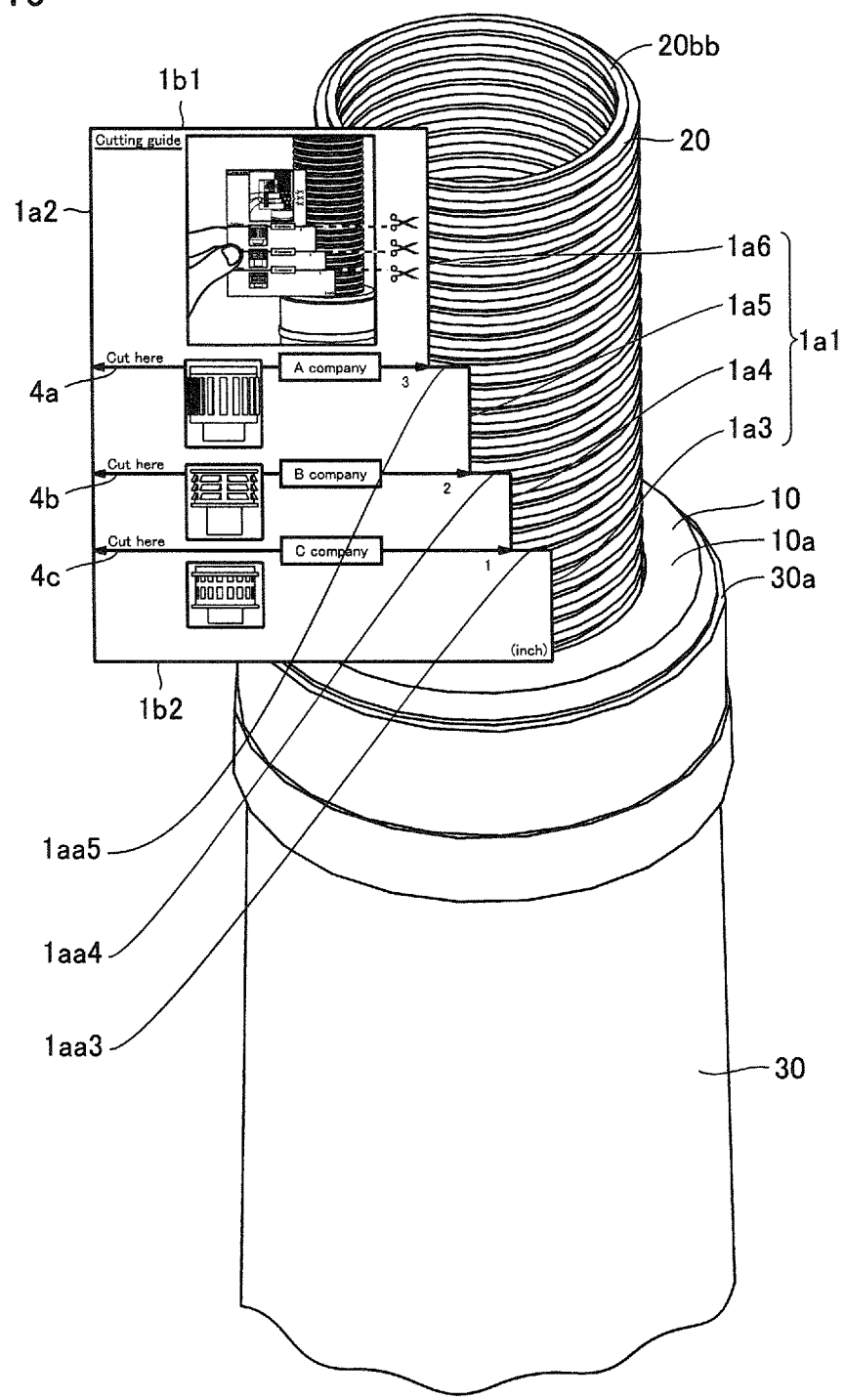
FIG. 19 is a partial perspective view schematically showing the fourth step in which a cutting guide in a third embodiment of the present invention is employed.

Referring to FIG. 19, cutting guide 1 in the present embodiment is different in construction from cutting guide 1 in the first embodiment in that end portion 1*a*1 has a stepped shape having a plurality of steps. Specifically, in end portion 1*a*1, an end portion 1*a*3 extending from a height position intersecting with end portion 1*b*2 to a height position in contact with arrow 4*c*, an end portion 1*a*4 extending from the height position in contact with arrow 4*c* to a height position in contact with arrow 4*b*, an end portion 1*a*5 extending from the height position in contact with arrow 4*b* to a height position in contact with arrow 4*a*, and an end portion 1*a*6 extending from the height position in contact with arrow 4*a* to a height position intersecting with end portion 1*b*1 are formed in a stepped shape. When arrows 4*a* to 4*c* are not in contact with end portion 1*a*1, a stepped shape is formed with a position of intersection between an extension of each of arrows 4*a* to 4*c* and end portion 1*a*1 being defined as the starting point.

Thus, as shown in FIG. 19, in the fourth step in installation of an exhaust tube, a worker can put a mark on the outer circumferential surface of exhaust tube 20 located on an extension of any of arrows 4*a* to 4*c*, with end portions 1*aa*3, 1*aa*4, and 1*aa*5 at positions meeting the extensions of arrows 4*a* to 4*c*, respectively, being defined as the reference, that is, by using end portions 1*aa*3, 1*aa*4, and 1*aa*5 instead of a ruler or a measuring tape. Therefore, putting a mark on exhaust tube 20 is facilitated, and in addition, accuracy in doing so is also improved.

Fourth Embodiment

A construction of a cutting guide in a fourth embodiment will be described with reference to FIGS. 20 and 21.

Figure 20:
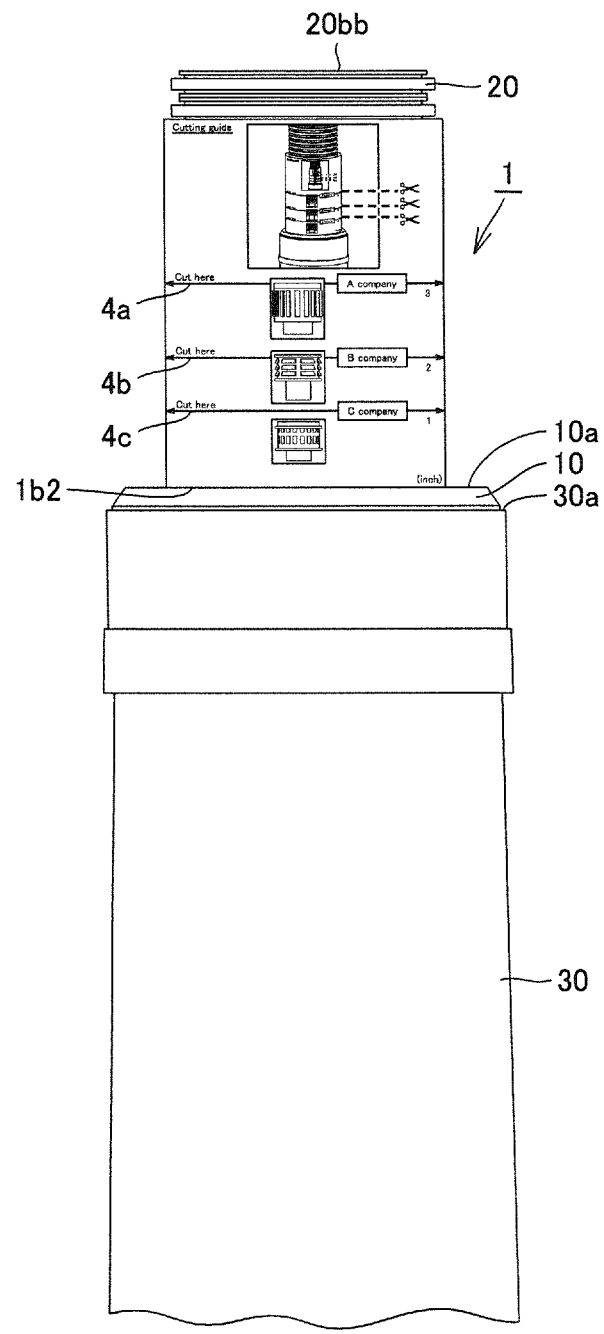
FIG. 20 is a partial side view schematically showing the fourth step in which a cutting guide in a fourth embodiment of the present invention is employed.
Figure 21:
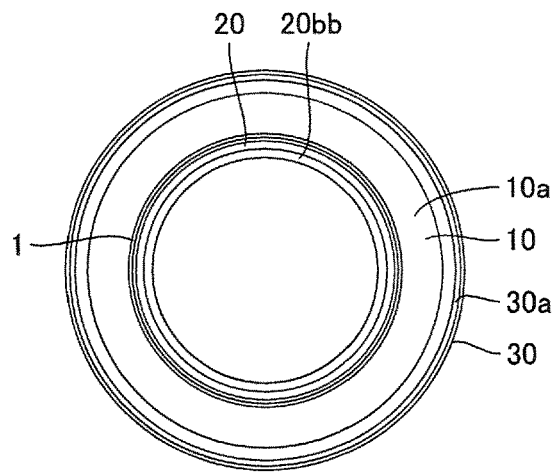
FIG. 21 is a top view of FIG. 20.

Referring to FIGS. 20 and 21, cutting guide 1 in the present embodiment is different in construction from cutting guide 1 in the first embodiment in that cutting guide 1 is implemented by a cylindrical member rather than a rectangular sheet member, and a part of the outer circumferential surface of the exhaust tube protruding from the end portion of the exhaust pipe unit on the outdoor side can be surrounded from the outer circumferential side. Specifically, the entire shape of cutting guide 1 is cylindrical, and an inner diameter thereof is greater than an outer diameter of exhaust tube 20 and smaller than an outer diameter of exhaust pipe 30. Each indication described above is shown on an outer surface of cutting guide 1.

Thus, as shown in FIGS. 20 and 21, in the fourth step in installation of an exhaust tube, cutting guide 1 is layered over exhaust tube 20, so that end portion 1*b*1 which is the reference site of cutting guide 1 is maintained at a position abutting to upper surface 10*a* of exhaust adapter 10 and a part of the outer surface of exhaust tube 20 can be arranged to be covered with an inner surface of cutting guide 1. Namely, without a worker holding cutting guide 1, end portion 1*b*1 which is the reference site of cutting guide 1 can be aligned with upper surface 10*a* of exhaust adapter 10 and a vertical side (an up-down direction in the drawing) of cutting guide 1 which corresponds to end portion 1*a*1 can be aligned with the outer circumferential surface of exhaust tube 20. In this case, since cutting guide 1 is fixed to the outer circumferential surface of exhaust tube 20, the worker does not have to hold cutting guide 1 at a prescribed position in cutting exhaust tube 20. Therefore, for example, exhaust tube 20, together with the cutting guide, can be cut without putting a mark on exhaust tube 20. Alternatively, by forming a slit for putting a mark along arrows 4*a* to 4*c*, a cutting position can accurately be marked without holding a cutting guide.

Fifth Embodiment

A construction of a cutting guide in a fifth embodiment will be described with reference to FIG. 22.

Figure 22:
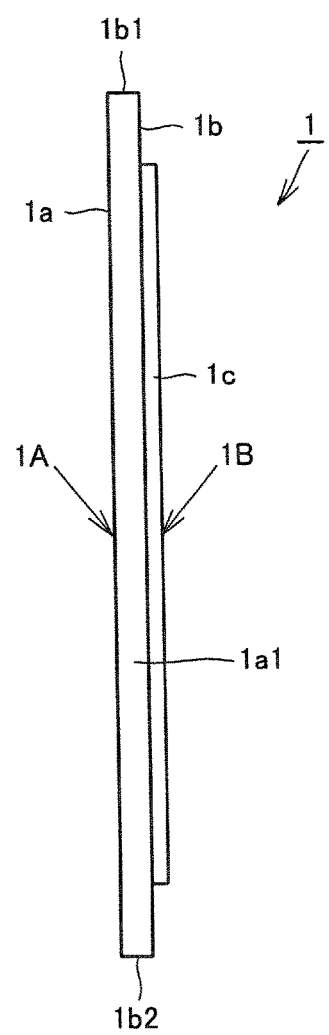
FIG. 22 is a side view of a cutting guide in a fifth embodiment of the present invention.

Referring to FIG. 22, cutting guide 1 in the present embodiment is different from the cutting guide in the first embodiment in having a sheet member having a surface where the cutting position described above is shown and an adhesive material formed on a surface opposite to the surface of the sheet member where the cutting position is shown. Specifically, cutting guide 1 in the present embodiment has a sheet member 1A constructed similarly to the cutting guide in the first embodiment and an adhesive material 1B formed on a back surface 1*b* (a surface opposite to front surface 1*a* having each indication) of sheet member 1A. A type of an adhesive material is not particularly restricted so long as it can adhere cutting guide 1 and exhaust tube 20 to each other, and a commercially available adhesive material can be employed as appropriate.

Since cutting guide 1 can thus be stuck to exhaust tube 20, a worker does not have to hold cutting guide 1 at a prescribed position in cutting exhaust tube 20. Therefore, for example, a mark can more accurately be put on exhaust tube 20.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A cutting guide for adjusting a length of an exhaust tube introduced in an exhaust pipe so as to adapt to combination of said exhaust pipe communicating from inside to outside of a building with an exhaust terminal attached to an end portion of said exhaust pipe on an outdoor side, comprising:
    a reference site for alignment with an exhaust pipe unit including said exhaust pipe; and
    a first indication of a cutting position of said exhaust tube for adjusting a length of said exhaust tube protruding from an end portion of said exhaust pipe unit on the outdoor side to a length adapted to a type of said exhaust terminal, wherein
    the cutting guide has a second indication of at least one of an illustration, a character, and a graphic representation of the cutting guide, the exhaust pipe unit, and the exhaust tube, showing a use situation of the cutting guide in which the reference site of the cutting guide is aligned with an upper surface of the end portion of the exhaust pipe unit on the outdoor side and another site other than the reference site of the cutting guide is aligned with an outer circumferential surface of the exhaust tube protruding from the end portion of the exhaust pipe unit on the outdoor side,
    said first indication indicates the cutting position in accordance with the type of said exhaust terminal,
    said cutting position in accordance with the type of said exhaust terminal is indicated with a graphic representation representing the exhaust terminal and an indication indicating the cutting position,
    the graphic representation representing the exhaust terminal is arranged at a position corresponding to a position at which the indication indicating the cutting position of the exhaust tube adapted to the exhaust terminal is arranged, and
    the cutting guide does not have a through hole.

2. The cutting guide according to claim 1, wherein
    said graphic representation representing the exhaust terminal is at least any one of a photograph and an illustration of said exhaust terminal.

3. The cutting guide according to claim 1, wherein
    said cutting guide is a rectangular sheet member and has one side for alignment with the outer circumferential surface of said exhaust tube protruding from said end portion of said exhaust pipe unit on the outdoor side and another side for alignment with the upper surface of said end portion of said exhaust pipe unit on said outdoor side, and
    said another side intersects with said one side and implements said reference site.

4. The cutting guide according to claim 3, wherein
    said one side has a shape fitting to a shape of the outer circumferential surface of said exhaust tube.

5. The cutting guide according to claim 3, wherein
    said one side has a stepped shape having a plurality of steps and at least one step of said plurality of steps corresponds to illustrated said cutting position.

6. The cutting guide according to claim 1, wherein
    said cutting guide is a cylindrical member and constructed to be able to surround from an outer circumferential side, a part of the outer circumferential surface of said exhaust tube protruding from said end portion of said exhaust pipe unit on the outdoor side.

7. The cutting guide according to claim 1, wherein
    said cutting guide has a sheet member having a surface where said cutting position is shown and an adhesive material formed on a surface opposite to the surface of said sheet member where said cutting position is shown.

8. The cutting guide according to claim 1, wherein
    a surface of said cutting guide where at least said cutting position is shown is waterproofed.

* * * * *